(12) United States Patent
Elliot et al.

(10) Patent No.: US 12,397,379 B2
(45) Date of Patent: Aug. 26, 2025

(54) NICKEL-CARBON AND NICKEL-COBALT-CARBON BRAZES AND BRAZING PROCESSES FOR JOINING CERAMICS AND METALS AND SEMICONDUCTOR PROCESSING AND INDUSTRIAL EQUIPMENT USING SAME

(71) Applicant: WATLOW ELECTRIC MANUFACTURING COMPANY, St. Louis, MO (US)

(72) Inventors: Alfred Grant Elliot, Palo Alto, CA (US); Brent Elliot, Cupertino, CA (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 0 days.

(21) Appl. No.: 18/640,196

(22) Filed: Apr. 19, 2024

(65) Prior Publication Data
US 2024/0278359 A1    Aug. 22, 2024

Related U.S. Application Data

(62) Division of application No. 18/329,756, filed on Jun. 6, 2023, which is a division of application No. 16/423,626, filed on May 28, 2019, now Pat. No. 11,666,993.

(60) Provisional application No. 62/684,197, filed on Jun. 13, 2018.

(51) Int. Cl.
*B23K 35/30* (2006.01)
*B23K 1/008* (2006.01)
*B23K 20/00* (2006.01)
*B23K 20/14* (2006.01)
*B23K 35/02* (2006.01)
*B23K 103/00* (2006.01)
*B23K 103/08* (2006.01)

(52) U.S. Cl.
CPC .......... *B23K 35/3033* (2013.01); *B23K 1/008* (2013.01); *B23K 20/008* (2013.01); *B23K 20/14* (2013.01); *B23K 35/0238* (2013.01); *B23K 2103/08* (2018.08); *B23K 2103/52* (2018.08)

(58) Field of Classification Search
None
See application file for complete search history.

(56) References Cited

U.S. PATENT DOCUMENTS

| | | | | |
|---|---|---|---|---|
| 3,091,028 A | * | 5/1963 | Westbrook ............. | B23K 35/32 420/417 |
| 3,284,174 A | * | 11/1966 | Zimmer .................... | B22F 7/00 428/547 |
| 4,460,382 A | * | 7/1984 | Ohno .................... | C04B 35/573 51/307 |

(Continued)

*Primary Examiner* — Devang R Patel
(74) *Attorney, Agent, or Firm* — Burris Law, PLLC

(57) ABSTRACT

A joining method includes placing a brazing element between an interface area of a first ceramic piece and an interface area of a second ceramic piece to create a joining pre-assembly and placing the components of said joining pre-assembly into a process chamber. Oxygen is removed from said process chamber and at least said brazing element of said joining pre-assembly is heated, thereby hermetically joining said first ceramic piece to said second ceramic piece. Said brazing element consists of Cobalt and Carbon.

17 Claims, 39 Drawing Sheets

(56) References Cited

U.S. PATENT DOCUMENTS

| | | | | |
|---|---|---|---|---|
| 4,596,354 A * | 6/1986 | Moorhead | ............ | C04B 37/026 |
| | | | | 228/262.9 |
| 4,604,328 A * | 8/1986 | Mizuhara | ........... | B23K 35/3013 |
| | | | | 420/512 |
| 4,900,638 A * | 2/1990 | Emmerich | ........... | B23K 35/304 |
| | | | | 148/403 |
| 5,794,838 A * | 8/1998 | Ushikoshi | ............. | C04B 37/026 |
| | | | | 228/122.1 |
| 6,190,467 B1 * | 2/2001 | Jackson | ............... | B23K 35/304 |
| | | | | 148/426 |
| 7,651,023 B2 * | 1/2010 | Huang | ............... | B23K 35/3033 |
| | | | | 228/248.1 |
| 9,056,443 B2 * | 6/2015 | Schick | ................. | B23K 1/0018 |
| 2015/0108203 A1 * | 4/2015 | Elliot | ...................... | B32B 9/041 |
| | | | | 228/121 |
| 2016/0184912 A1 * | 6/2016 | Elliot | ................... | B23K 35/302 |
| | | | | 228/121 |

\* cited by examiner

FIG. 38

Four-Phase Intersection Points with LIQUID

1: BCC_A2 / FCC_A1 / M7C3
2: FCC_A1 / M3C2 / M7C3
3: FCC_A1 / GRAPHITE / M3C2

A = Ni, B = C, C = Cr

| | X(A) | X(B) | X(C) | K |
|---|---|---|---|---|
| 1: | 0.37948 | 0.04060 | 0.57992 | 1554.56 |
| 2: | 0.70860 | 0.10216 | 0.18924 | 1541.76 |
| 3: | 0.72458 | 0.11201 | 0.16342 | 1526.62 |

Four-Phase Intersection Points with LIQUID

1: BCC_B2#1 / FCC_A1#1 / NITI2#1
2: BCC_A2#1 / FCC_A1#1 / NITI2#1

A = Ti, B = C, C = Ni

|   | X(A) | X(B) | X(C) | K |
|---|------|------|------|---|
| 1: | 0.63071 | 0.00365 | 0.36565 | 1386.32 |
| 2: | 0.76113 | 0.00246 | 0.23642 | 1271.76 |

Four-Phase Intersection Points with LIQUID

1: GRAPHITE / M3C2 / M7C3
2: BCC_A2#1 / M23C6 / M7C3
3: BCC_A2#1 / FCC_A1 / M7C3
4: CEMENTITE / GRAPHITE / M7C3
5: CEMENTITE / FCC_A1 / M7C3
6: CEMENTITE / FCC_A1 / GRAPHITE

A = Fe, B = C, C = Cr

| | X(A) | X(B) | X(C) | K |
|---|---|---|---|---|
| 1: | 0.24272 | 0.33854 | 0.41874 | 1816.85 |
| 2: | 0.52630 | 0.10692 | 0.36678 | 1564.44 |
| 3: | 0.57214 | 0.10939 | 0.31847 | 1555.82 |
| 4: | 0.73257 | 0.20451 | 0.06292 | 1483.71 |
| 5: | 0.75374 | 0.17536 | 0.07090 | 1451.40 |
| 6: | 0.81987 | 0.17560 | 0.00453 | 1423.84 |

Four-Phase Intersection Points with LIQUID

1: FCC_A1 / GRAPHITE / HCP_A3#1
2: BCC_A2#1 / HCP_A3#1 / M6C
3: BCC_A2#1 / M6C / SIGMA
4: M6C7 R_PHASE / SIGMA
5: BCC_A2#1 / M6C / R_PHASE
6: BCC_A2#1 / FCC A1 / M6C
7: CEMENTITE / FCC_A1 / GRAPHITE
8: FCC_A1 / HCP_A3#1 / M6C
9: GRAPHITE / HCP_A3#1 / KSI_CARBIDE
10: FCC_A1 / HCP_A3#1 / KSI_CARBIDE
11: CEMENTITE / GRAPHITE / KSI_CARBIDE
12: CEMENTITE / FCC_A1 / KSI_CARBIDE

A = Mo, B = C, C = Fe

|     | X(A)    | X(B)    | X(C)    | K       |
|-----|---------|---------|---------|---------|
| 1:  | 0.52608 | 0.42837 | 0.04556 | 2762.40 |
| 2:  | 0.50275 | 0.07637 | 0.42088 | 1898.11 |
| 3:  | 0.42944 | 0.04391 | 0.52665 | 1810.63 |
| 4:  | 0.31631 | 0.02752 | 0.65617 | 1730.01 |
| 5:  | 0.24356 | 0.02312 | 0.73332 | 1672.69 |
| 6:  | 0.11579 | 0.06412 | 0.82009 | 1620.34 |
| 7:  | 0.02200 | 0.17712 | 0.80088 | 1399.12 |
| 8:  | 0.09217 | 0.16860 | 0.73923 | 1365.83 |
| 9:  | 0.08543 | 0.18923 | 0.72535 | 1360.40 |
| 10: | 0.08789 | 0.17391 | 0.73820 | 1351.25 |
| 11: | 0.07981 | 0.18693 | 0.73326 | 1348.38 |
| 12: | 0.07676 | 0.18068 | 0.74257 | 1337.55 |

FIG. 42B

Four-Phase Intersection Points with LIQUID

1: CSi_SiC(s) / GRAPHITE / NI2SI_HEX
2: GRAPHITE / NI2SI_C37 / NI2SI_HEX
3: GRAPHITE / NI2SI_C37 / NI5SI2
4: GRAPHITE / NI5SI2 / Ni3Si_ORTHO(s2)
5: FCC_A1#1 / GRAPHITE / Ni3Si_ORTHO(s2)

|  | A = Si, B = C, C = Ni | | |
|---|---|---|---|
| X(A) | X(B) | X(C) | K |
| 1: 0.35615 | 0.00812 | 0.63573 | 1533.70 |
| 2: 0.30219 | 0.00905 | 0.68876 | 1519.29 |
| 3: 0.29313 | 0.00892 | 0.69795 | 1504.22 |
| 4: 0.23748 | 0.01066 | 0.75186 | 1458.49 |
| 5: 0.20659 | 0.01191 | 0.78149 | 1410.78 |

| C-M1-M2 System | M1 | M2 | [C] A% | [M1]** A% | [M2] A% | T_Eu °C | Reference | Figure 42a Symbol |
|---|---|---|---|---|---|---|---|---|
| C-Ni-M2 | Ni | Mo | 11.5 | 74.5 | 14 | 1250 | Groschner | X |
|  |  | Cr | 11.2 | 72.5 | 16.3 | 1249 | Velikanova | O |
|  |  | Ti | 8.5 | 84 | 7.5 | 977 | Factsage* | △ |
|  |  | Si | 1.2 | 78.1 | 20.7 | 1138 | Factsage* | △ |
| C-Co-M2 | Co | Mo | 14 | 70 | 16 | 1170 | Groschner | O |
|  |  | W | 12.1 | 82 | 5.9 | 1275 | Factsage* | △ |
| C-Fe-M2 | Fe | Mo | 18 | 74.3 | 7.7 | 1065 | Factsage* | ◻ |
|  |  | Nb | 16.4 | 82.4 | 1.2 | 1152 | Factsage* | ◻ |
|  |  | Si | 9.7 | 78.3 | 12 | 1167 | Factsage* | ◊ |
|  |  | V | 17.8 | 79.8 | 2.4 | 1139 | Factsage* | ◊ |

*Factsage: Data taken from the SGTE 2014 Data Base
(http://www.crct.polymtl.ca/fact/documentation/SGTE2014/SGTE2014_Figs.htm)
** Brackets ([i]) indicate element concentrations in the alloy

FIG. 44A

| C-M1-M2 System | M1 | M2 | [C]** A% | | | [M1]** A% | | | [M2]** A% | | | $T_{Eu}$ °C |
|---|---|---|---|---|---|---|---|---|---|---|---|---|
| | | | Eutectic | Range wide | Range narrow | Eutectic | Range wide | Range narrow | Eutectic | Range wide | Range narrow | |
| C-Ni-M2 | Ni | Mo | 11.5 | 5.7-17.3 | 8-13 | 74.5 | 63-94 | 70-85 | 14.0 | 4-23 | 7-20 | 1250 |
| | | Cr | 11.2 | 1.7-5.1 | 2.3-4.2 | 72.5 | 50-90 | 60-80 | 16.3 | 15-19 | 15.8-16.8 | 1249 |
| | | Ti | 8.5 | 4.5-13.4 | 7.0-11 | 84.0 | 80-90 | 82-87 | 7.5 | 2.5-10 | 5-9 | 977 |
| | | Si | 1.2 | 0.5-1.6 | 0.7-1.3 | 78.1 | 76-80 | 77-79 | 20.7 | 12-38 | 17-30 | 1138 |
| C-Co-M2 | Co | Mo | 14.0 | 7-21 | 10.5-17.5 | 70.0 | 60-94 | 66-80 | 16.0 | 15-19 | 15.5-16.8 | 1170 |
| | | W | 12.1 | 6.0-18 | 9.0-15 | 82.0 | 70-90 | 78-86 | 5.9 | 2-10 | 4-7 | 1275 |
| C-Fe-M2 | Fe | Mo | 18.0 | 8.5-25 | 12-21 | 74.3 | 65-85 | 70-80 | 7.7 | 3-10 | 6-8.5 | 1065 |
| | | Nb | 16.4 | 8.2-25 | 12.3-20.8 | 82.4 | 78-90 | 80-85 | 1.2 | 0.4-1.6 | 0.8-1.4 | 1152 |
| | | Si | 9.7 | 4.5-14.5 | 7.1-12.3 | 78.3 | 76-90 | 77-82 | 12.0 | 5-21 | 8-17 | 1157 |
| | | V | 17.8 | 9-27 | 13-23 | 79.8 | 75-90 | 77.5-82 | 2.4 | 1-4 | 1.8-3.0 | 1139 |

** Brackets ([i]) indicate element concentrations in the alloy

FIG. 44B

| Element | Raw Powder Braze | | SEM EDX Analysis | | | | | | | |
|---|---|---|---|---|---|---|---|---|---|---|
| | | | Bulk Braze | | Matrix | | Light Phase | | Dark Phase | |
| | Wt% | A% | Wt% | A% | Wt% | A% | Wt% | A% | Wt% | A% |
| Ni/Co | 85.4 | 84.6 | 74.4 | 52.2 | 87.4 | 77.9 | 6.65 | 10.2 | 12.3 | 2.93 |
| Mo | 13 | 7.9 | 12.3 | 5.3 | 7.2 | 4 | 93.2 | 89.3 | 1 | 0.2 |
| C | 1.6 | 7.5 | 11.9 | 40.4 | 3.2 | 14 | - | - | 86.5 | 96.8 |
| Al | - | - | 1.4 | 2.2 | 2.1 | 4.1 | 0.1 | 0.4 | 0.1 | 0.1 |
| Si | - | - | - | - | - | - | - | - | 0.1 | 0.1 |

NICKEL-CARBON AND NICKEL-COBALT-CARBON BRAZES AND BRAZING PROCESSES FOR JOINING CERAMICS AND METALS AND SEMICONDUCTOR PROCESSING AND INDUSTRIAL EQUIPMENT USING SAME

CROSS-REFERENCE TO RELATED APPLICATIONS

This application is a divisional of U.S. patent application Ser. No. 18/329,756, filed on Jun. 6, 2023, which is a divisional of U.S. patent application Ser. No. 16/423,626, filed on May 28, 2019 and now U.S. Pat. No. 11,666,993, which claims priority to and the benefit of U.S. Provisional Application No. 62/684,197, filed on Jun. 13, 2018. The disclosures of the above applications are incorporated herein by reference in their entireties.

FIELD

The present invention relates to the brazing of ceramics and metals, and more particularly to brazing using Nickel-Carbon and Nickel-Cobalt-Carbon alloys.

BACKGROUND

The statements in this section merely provide background information related to the present disclosure and may not constitute prior art.

The joining of ceramic materials may involve processes which require very high temperatures and very high contact pressures. For example, liquid phase sintering may be used to join ceramic materials together. In this type of manufacture, at least two drawbacks are seen. First, the hot pressing/sintering of a large, complex ceramic piece requires a large physical space within a very specialized process oven. Second, should a portion of the finished piece become damaged, or fail due to wear, there is no repair method available to disassemble the large piece. The specialized fixturing, high temperatures, and inability to disassemble these assemblies invariably leads to very high manufacturing costs.

Other processes may be geared towards strength, and may yield strong bonds between the pieces that, although structurally sufficient, do not hermetically seal the pieces. In some processes, diffusion bonding is used, which may take significant amounts of time, and may also alter the individual pieces such that they form new compounds near the joint. This may render them unfit for certain applications, and unable to be reworked or repaired and rejoined. What is called for is a joining method for joining ceramic pieces at a lower temperature and which provides a hermetic seal, and which allows for repairs.

Electrical feedthroughs are commonly used to transfer electrical power and signals between a device within a vacuum chamber and equipment positioned outside the vacuum chamber. For example, some devices in a vacuum chamber, such as thermal evaporation sources or substrate heater, need electrical power from the exterior of the vacuum chambers. In addition, some devices in vacuum chambers, such as temperature sensors or measurement devices, have to send signals to equipment outside of the vacuum chambers for analysis.

An electrical feedthrough for these environments is generally an airtight passage mounted on the wall of a vacuum chamber. One or more conductors may be provided in an electrical feedthrough. Each conductor is surrounded by insulators to keep it insulated from the wall of the chamber. The insulators may be glass or ceramic materials.

Some electric feedthroughs have glass-to-metal seals with pin contacts used with standard connectors. Some other approaches use ceramic-metal brazed pins mounted on metal flanges. Many electric feedthroughs use Kovar in an attempt to match the coefficient of thermal expansion of the metallic of the ceramic insulator. Kovar has distinct disadvantages with regard to welding, including the likelihood that expensive e-beam welding must be used.

In semiconductor manufacturing, high-energy gas plasma, which is both corrosive and high temperature, is used to effect processing necessary in the making of integrated circuits. In many applications, components are used in the processing environment to contain and direct the plasma. Typically these components, commonly called edge rings, focus rings, gas rings, gas plates, blocker plates, etc., are made from quartz, silicon, alumina, or aluminum nitride. It is not uncommon for these components to have lifetimes measured in hours, as the erosion of the parts by the plasma causes process drift and contamination, requiring replacement of the components after short service times. In some applications, the plasma is injected into the processing environment by use of an array of ceramic nozzles. These nozzles are monolithic parts, with complex geometries, and with a small orifice on the order of 0.010" diameter for controlling the flow rate and pattern of the plasma. Typical materials for these nozzles are aluminum oxide or aluminum nitride. Even with the use of these advanced ceramics, lifetime of the nozzles is 3 months due to erosion of the orifice by the high energy plasma. This requires that the machine be completely shut down every three months to replace the nozzle array, typically comprising more than 20 individual nozzles. While the nozzles are being eroded, they release contaminants into the plasma that reduce yields of the processing. And as the nozzles approach their end-of-life, the flow of the plasma begins to increase due to erosion of the orifice, which causes the process performance to change, further reducing yields. Other advanced ceramic materials have significantly lower erosion rates in that plasma environment, such as sapphire and yttrium oxide. If components such as edge rings and injector nozzles could be made with these materials, significant lifetime and performance improvements would result. However, the manufacturing and cost limitations mentioned above, limit the use of such materials for this application.

SUMMARY

This section provides a general summary of the disclosure and is not a comprehensive disclosure of its full scope or all of its features.

A brazing process using Nickel(Ni)-Carbon as graphite (Cg) alloys, Ni-Cg-Molybdenum(Mo) alloys, and Ni-Cobalt (Co)-Cg-Mo alloys for brazing together ceramics, ceramics to metals, and metals to metals. Semiconductor processing equipment made with the use of Ni-Cg alloys, such as heaters and chucks. Semiconductor processing equipment components and industrial equipment components using a highly wear resistant surface layer, such as sapphire, joined to a substrate such as a ceramic, with a Ni-Cg alloy braze.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 38 is a marked up periodic table of the elements.

FIG. 42B are phase intersection points and other information pertaining the ternary phase diagram of FIG. 42A.

FIG. 44A is a table showing relevant ternary eutectic compositions and eutectic temperatures according to some embodiments of the present invention.

FIG. 44B is a table showing relevant ternary eutectic compositions and eutectic temperatures according to some embodiments of the present invention.

Figure 1:
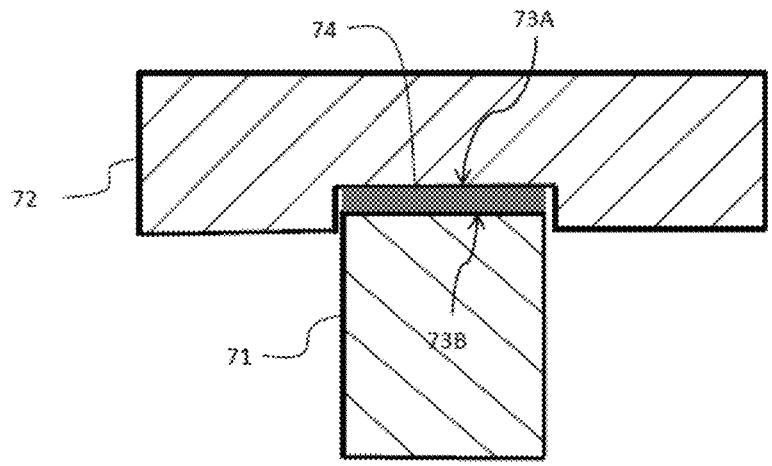
FIG. 1 is a cross-sectional view of a joined ceramic assembly according to some embodiments of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a cross section of an embodiment of a joint in which a first ceramic piece 72 is joined to a second ceramic piece 71, which may be made of the same or a different material, for example. A joining material, such as a joint filler material 74, may be included, which can be selected from the combinations of materials or binders described herein and may be delivered to the joint according to the methods described herein. With respect to the joint depicted in FIG. 1, the first ceramic piece 72 is positioned such that a joint interface surface 73A of the first ceramic piece 72 abuts the second ceramic piece 71 along its joint interface surface 73B with only the joint filler material interposed between the surfaces to be joined. The thickness of the joint is exaggerated for clarity of illustration. In some embodiments, a recess may be included in one of the mating pieces, the first ceramic piece 72 in this example, which allows the other mating piece to reside within the recess.

Figure 2:
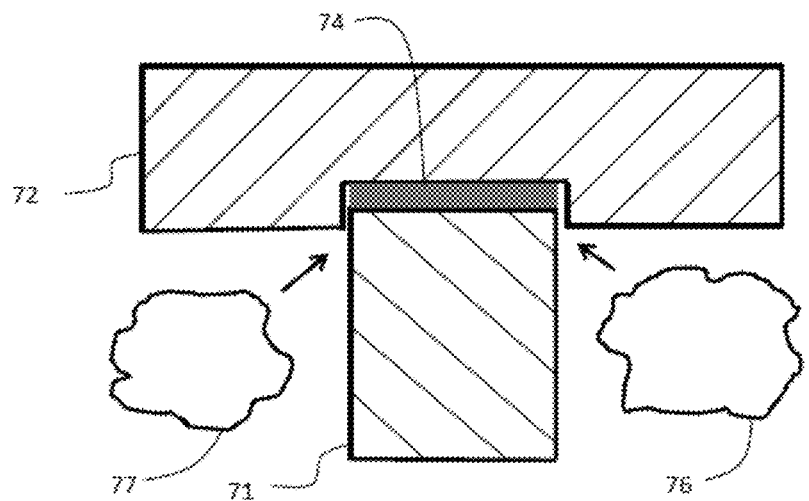
FIG. 2 is a cross-sectional view of a joint which bridges different atmospheres according to some embodiments of the present invention.

As seen in FIG. 2, the joining material may bridge between two distinct atmospheres, both of which may present significant problems for prior joining materials, including brazing materials. On a first surface of the joint, the joining material may need to be compatible with the processes occurring, and the environment 77 present, in the semiconductor processing chamber in which the joined ceramic assembly is to be used. On a second surface of the joint, the joining material may need to be compatible with a different atmosphere 76, which may be an oxygenated atmosphere. For example, braze elements containing copper, silver, or gold may interfere with the lattice structure of a silicon wafer being processed in a chamber with the joined ceramic, and are thus not appropriate. However, in some cases, a surface of the joint may see a high temperature, and an oxygenated atmosphere. The portion of the joint which would be exposed to this atmosphere will oxidize, and may oxidize inwardly into the joint, resulting in a failure of the hermiticity of the joint. In addition to structural attachment, the joint between joined ceramic pieces to be used in semiconductor manufacturing must be hermetic in many, if not most or all, uses.

Figure 3:
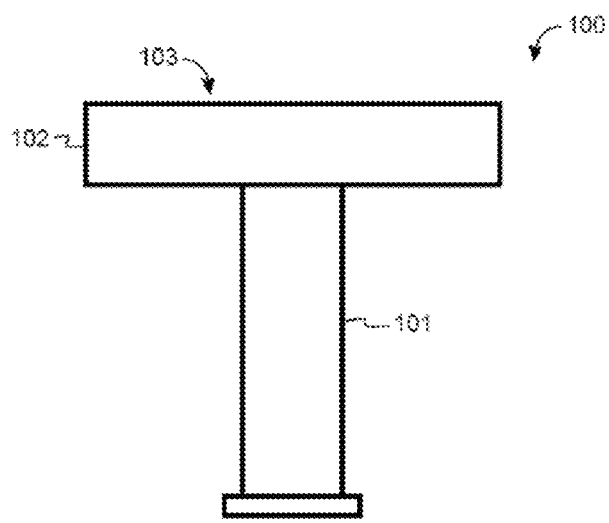
FIG. 3 is a view of a plate and shaft device used in semiconductor processing according to some embodiments of the present invention.

FIG. 3 illustrates an exemplary plate and shaft device 100, such as a heater, used in semiconductor processing. In some aspects, the plate and shaft device 100 is composed of a ceramic, such as aluminum nitride. The heater has a shaft 101 which in turn supports a plate 102. The plate 102 has a top surface 103. The shaft 101 may be a hollow cylinder. The plate 102 may be a flat disc. Other subcomponents may be present. In some present processes, the plate 102 may be manufactured individually in an initial process involving a process oven wherein the ceramic plate is formed.

Figure 4:
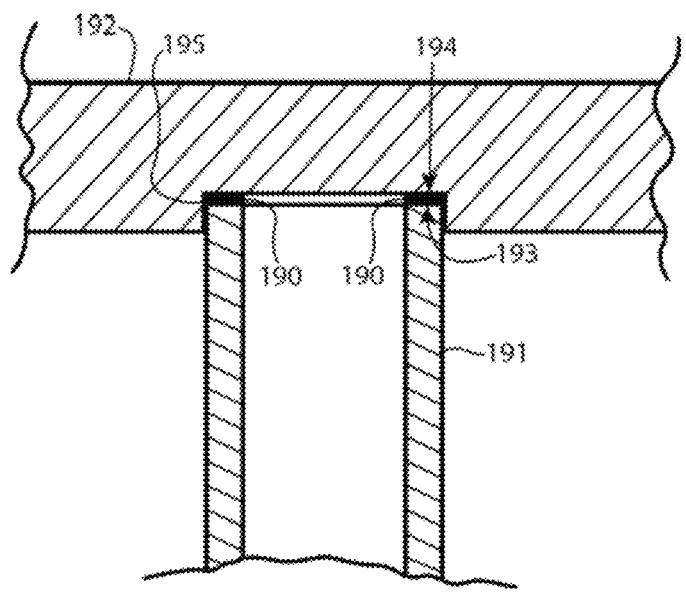
FIG. 4 is a cross-sectional view of a joint between a plate and shaft according to some embodiments of the present invention.

FIG. 4 shows a cross section of a second embodiment of a joint in which a first ceramic object, which may be a ceramic shaft 191, for example, may be joined to a second ceramic object, which may be made of the same or a different material, and which may be a ceramic plate 192, for example. A joining material, such as brazing layer 190, may be included, which can be selected from the combinations of braze layer materials described herein and may be delivered to the joint according to the methods described herein. The ceramic plate 192 has a joining interface surface 194 and the ceramic shaft 191 has a joining interface layer 193. In some aspects, the plate may be aluminum nitride and the shaft may be zirconia, alumina, or other ceramic. In some aspects, it may be desired to use a shaft material with a lower conductive thermal transfer coefficient in some embodiments.

Figure 5:
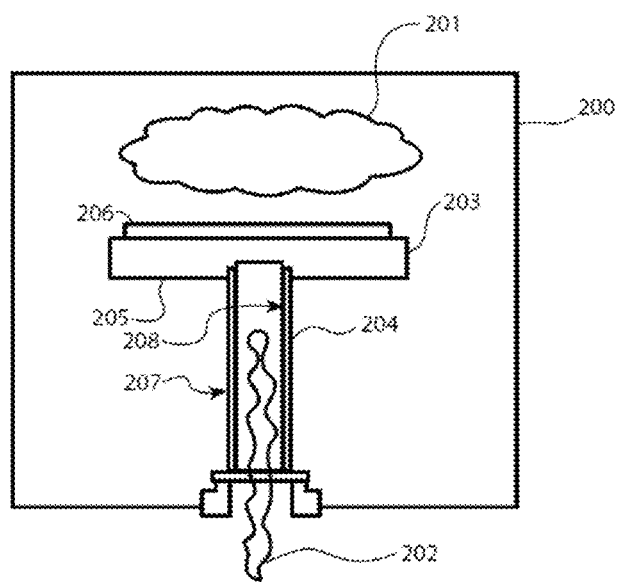
FIG. 5 is a partial cross-sectional view of a plate and shaft device in use in semiconductor manufacturing according to some embodiments of the present invention.

As seen in FIG. 5, the joining material may bridge between two distinct atmospheres, both of which may present significant problems for prior joining materials. On an external surface 207 of the semiconductor processing equipment, such as a heater 205, the joint material must be compatible with the processes occurring in, and the environment 201 present in, the semiconductor processing chamber 200 in which the heater 205 will be used. The heater 205 may have a substrate 206 affixed to a top surface of the plate 203, which is supported by a shaft 204. On an internal surface 208 of the heater 205, the joining layer material must be compatible with a different atmosphere 202, which may be an oxygenated atmosphere. For example, joints containing copper, silver, or gold may interfere with the lattice structure of the silicon wafer being processed, and are thus not appropriate. However, in the case of a joint joining a heater plate to a heater shaft, the interior of the shaft typically sees a high temperature, and has an oxygenated atmosphere within the center of the hollow shaft. The portion of the joint which would be exposed to this atmosphere will oxidize, and may oxidize into the joint, resulting in a failure of the hermeticity of the joint. In addition to structural attachment, the joint between the shaft and the plate of these devices to be used in semiconductor manufacturing must be hermetic in many, if not most or all, uses.

Figure 6:
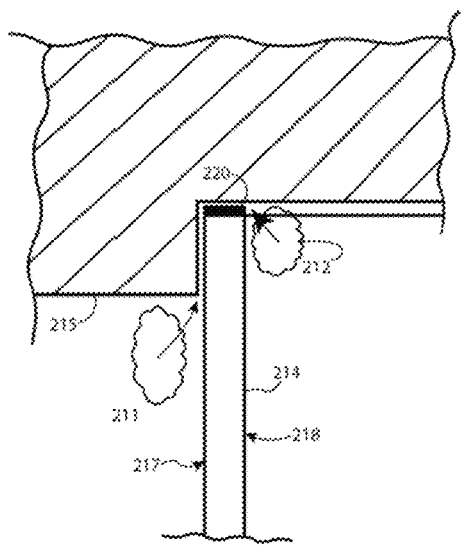
FIG. 6 is a close-up cross-sectional view of a joint between and shaft and a plate according to some embodiments of the present invention.

FIG. 6 illustrates a joint 220 used to join a plate 215 to a shaft 214 according to some embodiments of the present invention. The joint 220 has created a structural and hermetic joint which structurally supports the attachment of the plate 215 to the shaft 214. The joint 220 has created a hermetic seal which isolates the shaft atmosphere 212 seen by the interior surface 218 of the shaft 214 from the chamber atmosphere 211 seen along the exterior surface 217 of the shaft 214 and within the process chamber. The joint 220 may be exposed to both the shaft atmosphere and the chamber atmosphere and must therefore be able withstand such exposure without degradation which may result in the loss of the hermetic seal. In this embodiment, the plate and the shaft may be ceramic such as aluminum nitride.

Figure 7:
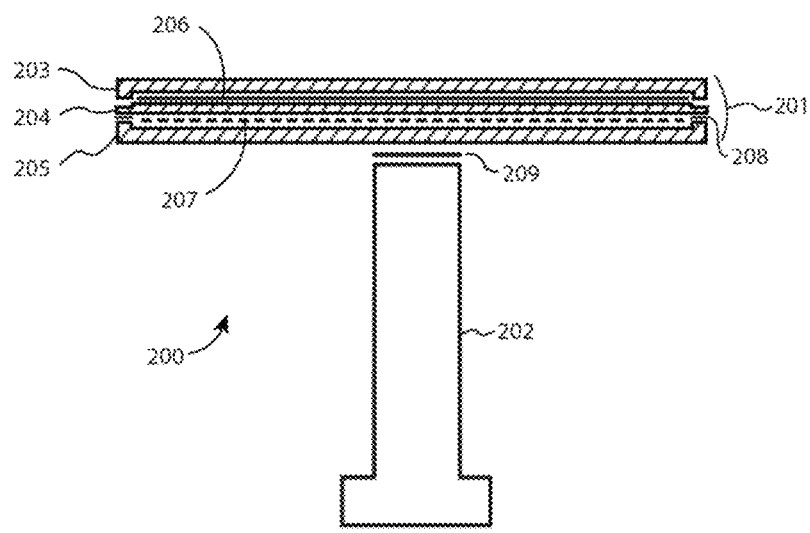
FIG. 7 is a partial cross-sectional view of a heater with a multi-layer plate according to some embodiments of the present invention.

In some embodiments of the present invention, as seen in expanded view in FIG. 7, a plate and shaft device 200 is seen with a plate assembly 201 and a shaft 202. The plate assembly 201 has layers 203, 204, 205 which are fully fired ceramic layers prior to their assembly into the plate assembly 201. The top plate layer 203 overlays the middle layer 204 with an electrode layer 206 residing between the top plate layer 203 and the middle layer 204. The middle layer 204 overlays the bottom layer 205 with a heater layer 207 residing between the middle layer 204 and the bottom layer 205.

The layers 203, 204, 205 of the plate assembly 201 may be of a ceramic such as aluminum nitride in the case of a heater, or other materials including alumina, doped alumina, AlN, doped AlN, beryllia, doped beryllia and others in the case of an electrostatic chuck. The layers 203, 204, 205 of the plate assembly that makes up the substrate support may have been fully fired ceramic prior to their introduction into the plate assembly 201. For example, the layers 203, 204, 205 may have been fully fired as plates in a high temperature high contact pressure specialty oven, or tape cast, or spark-plasma sintered, or other method, and then machined to final dimension as required by their use and their position in the stack of the plate assembly. The plate layers 203, 204, 205 may then be joined together using a joining process with joining layers 208 which allow the final assembly of the plate assembly 201 to be done without the need for a specialty high temperature oven equipped with a press for high contact stresses.

Figure 8:
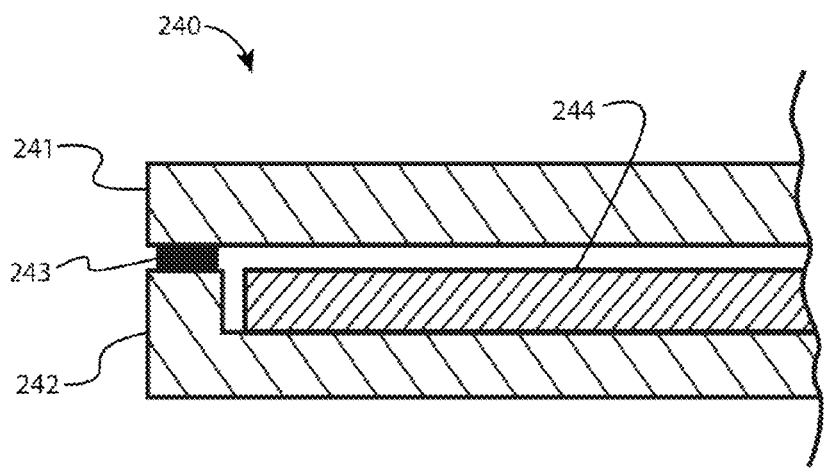
FIG. 8 is a partial cross-sectional view of a multi-layer plate according to some embodiments of the present invention.
Figure 9:
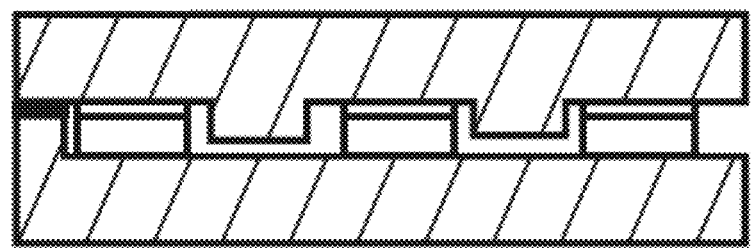
FIG. 9 is a partial cross-sectional view of a multi-layer plate according to some embodiments of the present invention.

FIG. 8 illustrates a partial cross-section of a plate assembly 240 according to some embodiments of the present invention. The plate assembly 240 may be adapted to be joined to a shaft to complete a plate and shaft assembly. The top plate layer 241 may be a circular disc adapted to support a substrate during semiconductor processing steps. A heater 244 is adapted to reside below the top plate layer 241. The heater may be attached or adhered to one or both of the plate layers. The top plate layer 241 overlays the bottom plate layer 242. A joining layer 243 joins the top plate layer 241 to the bottom plate 242. The joining layer may be an annular disc. In some embodiments, the top plate layer and the bottom plate layer are ceramic. In some embodiments, the top plate layer and the bottom plate layer are aluminum nitride. Examples of the joining process and materials are discussed herein. FIG. 9 illustrates an embodiment of heater elements between plate layers in a substrate support assembly according to some embodiments of the present invention.

In joining processes in support of the above-mentioned and below-mentioned devices, the brazing process utilizes nickel (Ni), cobalt (Co), molybdenum (Mo) and carbon (C)—typically as graphite (Cg), but also as diamond ($C_D$) and as carbon black ($C_B$)—alloyed in different ratios for the use of brazing ceramics to ceramics (ceramics such as AlN, $Al_2O_3$, $ZrO_2$, graphite, SiC, $Si_3N_4$ etc.), ceramics to metals (metals such as Ni, Mo, Co, niobium, iron, etc., and alloys thereof, e.g., steel, superalloys, etc.)

and metals to metals (such as superalloys to superalloys, Mo to superalloys, Ni to superalloys, etc.). In some aspects, the braze material comprises 65-80% Nickel, 20-35% Mo, and 0.1-4% Cg. In some aspects, the joining material comprises 3.5 to 25 atomic % of Carbon, 63.5 to 87.5 atomic % of an element or combination of elements from the group consisting of Iron, Cobalt, and Nickel, and 0-35 atomic % of an element or combination of elements from the group consisting of Ti, Zr, Hf, Nb, Ta, CR, Mo, W, and Si.

Figure 29:
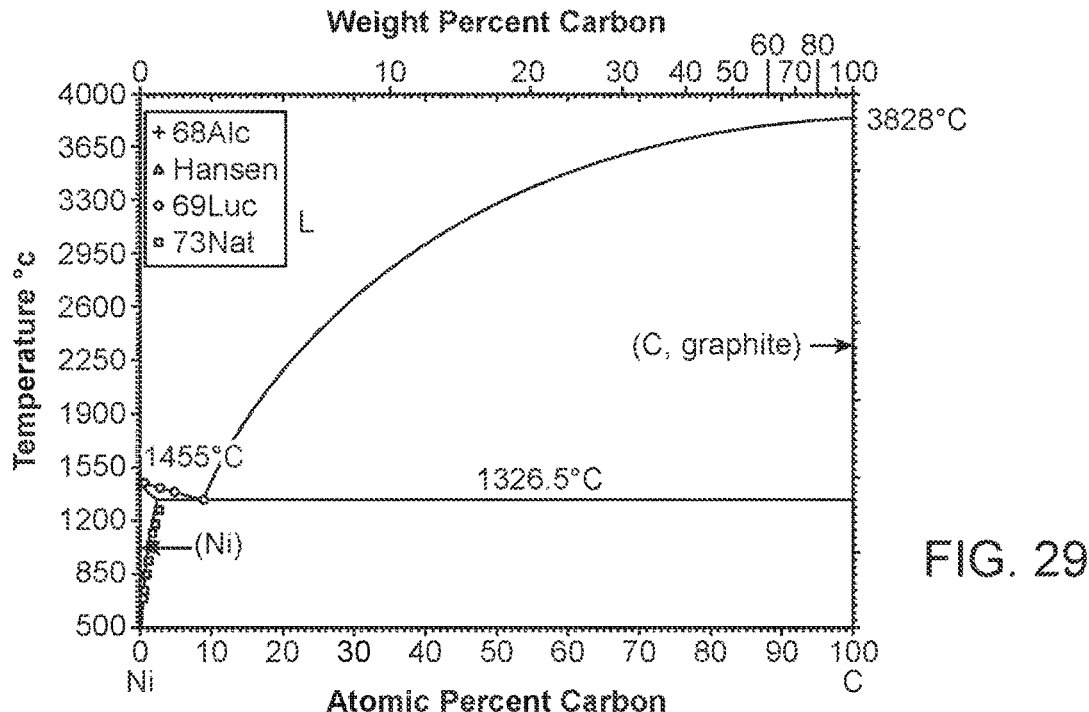
FIG. 29 is a Ni—C phase diagram.

M. Singleton and P. Nash, "The C—Ni (Carbon-Nickel) System", Bulletin of Alloy Phase Diagrams, Vol. 10, No. 2, 1989, describe the equilibrium phase diagram for the Ni—C (graphite) alloy system. Ni and C (as graphite=Cg) form a binary eutectic at the composition Ni—2 Wt. % Cg with an equilibrium melting temperature of about 1325 C, as shown in FIG. 29. A similar diagram, but including effects of the formation of a metastable $Ni_3C$ compound is given in FIG. 30.

Various experiments were carried out using mixed powders of Ni and C, where the Ni was a commercial powder of 3-4 micron size or was in the form of a nano-powder, while the carbon powder was in the form of nano-particles, diamond or carbon black. The Ni-diamond mixed powders having a high concentration of diamond (56 Wt %), pressed into pellets, and heat treated in a high vacuum at 1330 C for 2 hours resulted in sintered compacts exuding a liquid phase which wet and bonded strongly to graphite and stuck to AlN. Then, mixed powders of the equilibrium Ni—C eutectic composition (Ni—2 W % Cg), as seen in FIG. 29, were pressed into pellets and heated under high vacuum at 1320 C for 2 hours. This resulted in a dense compact which was swaged to about 1⁄32" thickness and placed between to AlN plates. Additional plates were placed on top to give added weight and the assembly was heated to 1325 C in a high vacuum. Along with this sample, a pressed pellet of the same composition was placed on top of an AlN plate. The high vacuum heat treatment resulted in complete melting of both pellets. The AlN pucks were tightly bonded together, and the free standing pellet was drawn up into a Sessile drop which adhered tightly to the AlN. In another experiment, a pellet of Ni—C eutectic composition was placed on top of a plate of hot pressed boron nitride (HPBN) and heat treated in a high vacuum at 1325 C. The pellet melted completely, forming a ball on the HPBN, but not sticking or reacting with it.

Figure 31:
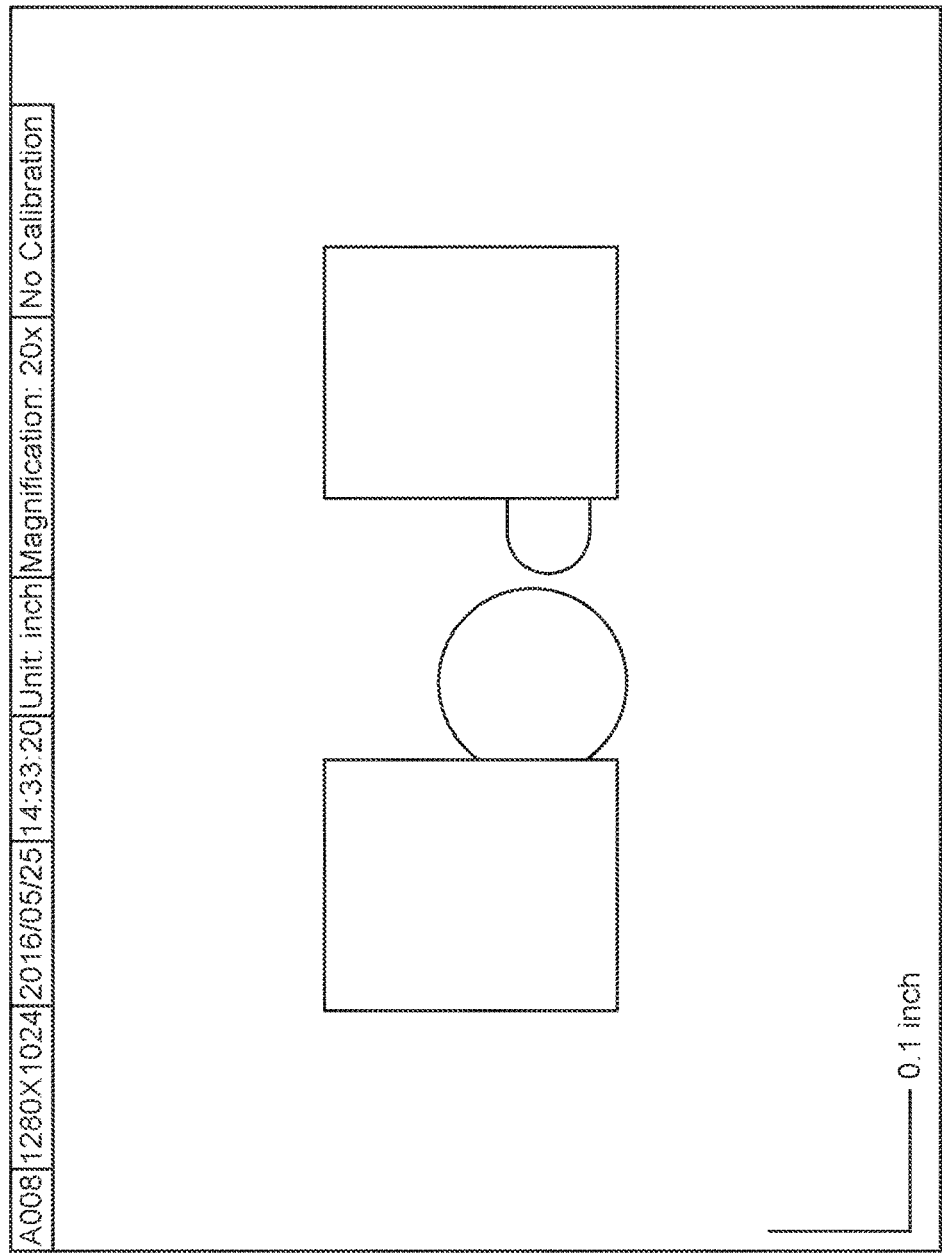
FIG. 31 is a photomacrograph of sessile drops of Ni-Cg eutectic alloy.

Ni—2 Wt % Cg foil was made by arc melting high purity Ni and Cg powders together and hot rolling to different thicknesses. Pieces of the foil were placed between plates of AlN and between blocks of $Al_2O_3$ and heated to 1330 C for 5 min. No melting was observed, but heating to 1340 C for 10 min. resulted in complete melting of the foil and bonding together of the ceramic pieces. This experiment was repeated with a newly compounded foil sample. Heating under high vacuum at a rate of 30 C per min. to 1325 C and holding for 3 min. did not melt the foil, but after cooling to room temperature, a second heating to 1330 C, resulted in complete melting of the foil and bonding of the AlN samples together. Pieces of foil of the Ni—2 Wt % Cg composition were placed between blocks of $Al_2O_3$, on top of a block of $Al_2O_3$, and on top of a block of AlN. These were heat treated to 1330 C for 5 min. under a high vacuum. The foil melted completely, forming Sessile drops on top of the ceramic blocks and bonding the $Al_2O_3$ blocks tightly together. Pictures of these Sessile drops are shown in FIG. 31. The drops are Ni-Cg eutectic (0.040" thick foil): Sessile Drops on Al2O3 (white)—and AlN (grey)—high vacuum heat treated (HVHT) at 1330 C, 5 min.

In some embodiments of the present invention, the joining material is Ni—C with 9 atomic % Carbon and the balance Nickel, a eutectic composition with a eutectic temperature of 1325 C. In some aspects, the Carbon atomic % is in the range of 8-10%. In some aspects, the Carbon atomic % is in the range of 8-12 atomic %. In some aspects, the Carbon atomic % is up to 80 atomic %. In some aspects, the Carbon atomic % is in the range of 1-80 atomic %.

In some embodiments of the present invention, the joining material is Co—C with 11.6 atomic % Carbon and the balance Cobalt, a eutectic composition with a eutectic temperature of 1324 C. In some aspects, the Carbon atomic % is in the range of 10-13%. In some aspects, the Carbon atomic % is in the range of 10-16 atomic %. In some aspects, the Carbon atomic % is up to 80 atomic %. In some aspects, the Carbon atomic % is in the range of 1-80 atomic %.

In some embodiments of the present invention, the joining material is Fe—C with 17.1 atomic % Carbon and the balance Fe, a eutectic composition with a eutectic temperature of 1130 C. In some aspects, the Carbon atomic % is in the range of 13-25%. In some aspects, the Carbon atomic % is in the range of 5-80 weight %.

Figure 32:
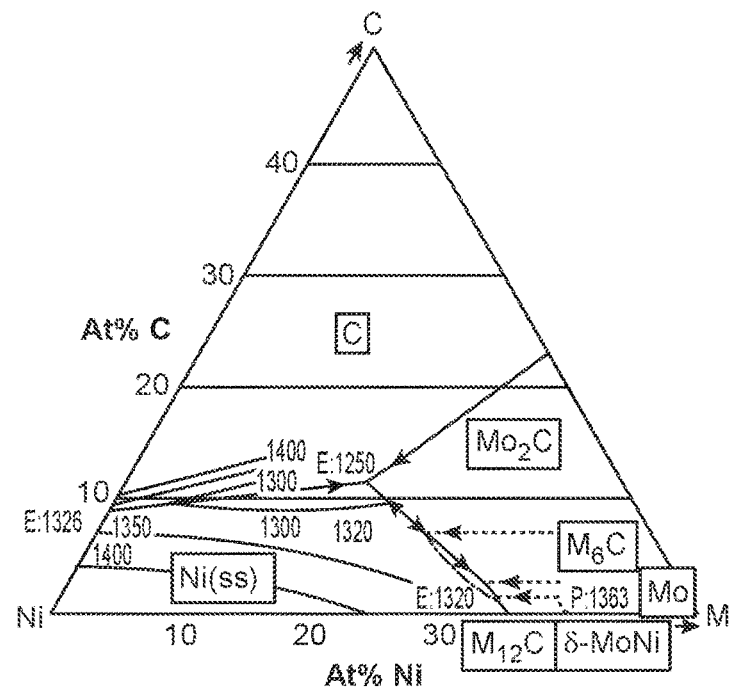
FIG. 32 is a C—Ni—Mo phase diagram.
Figure 33:
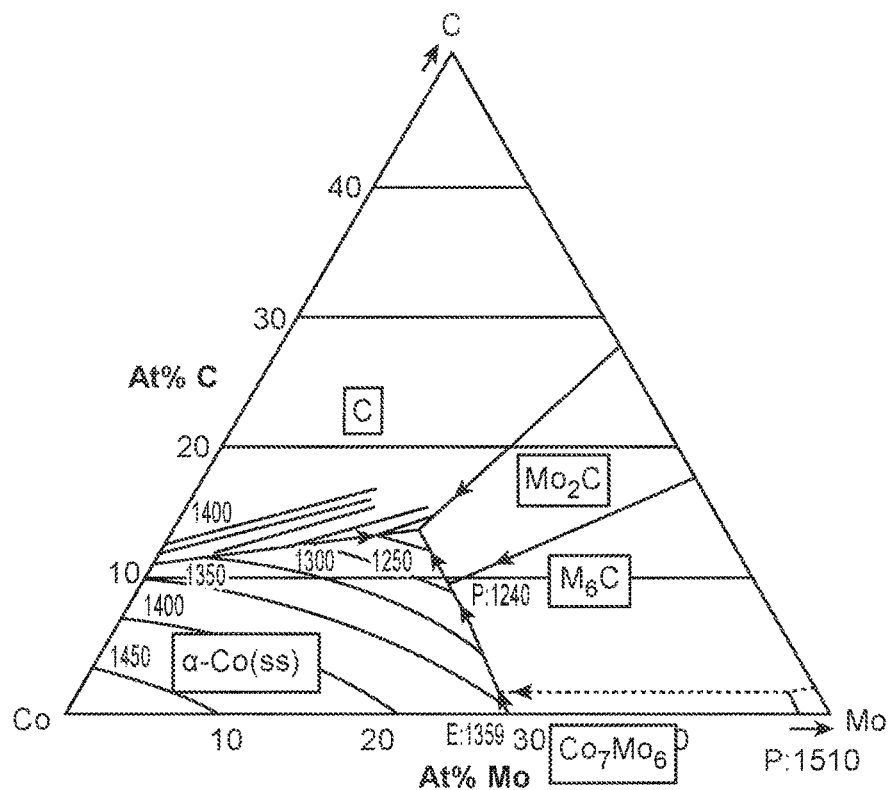
FIG. 33 is a C—Co—M phase diagram.

M. Groschner, et al, "The melting behavior of Ni—Mo—C and Co—Mo—C alloys," La Revue de Metallurgie-CIT/Science et Genie des Materiaux, Vol. 91, No. 12, pp 1767-1776 (1994) describe experiments concerned with the melting of mixed metal powders of Ni or Co with Mo and Cg that lead to the establishment of the respective ternary alloy phase diagrams. These diagrams are shown in FIG. 32 (Ni—Mo—C) and FIG. 33 (Co—Mo—C). These particular diagrams as well as the others that are discussed below are called "liquidous projections". These projections are viewed as a sort of topographic map where the vertical axis (a fourth axis normal to the plane of the paper), is temperature, and one is viewing a surface of different compositions and temperatures covered by only liquid. Temperature isotherms are generally shown and intersection lines may be viewed as "ravines".

Ni-rich alloys in these ternary systems have now been found to bond to AlN and braze AlN to AlN, bond to $Al_2O_3$ and braze $Al_2O_3$ to $Al_2O_3$, as well as brazing AlN to Mo and brazing Ni to Ni and Ni to high temperature alloys of Ni (known as "super alloys") at temperatures lower than those for the Ni—2 Wt % Cg eutectic. These compositions may also bond to and braze other ceramic materials as well as braze them to metals. A mixture of nickel, molybdenum and carbon in a ratio that produces a eutectic has an equilibrium melting point about 1250 C+/−10 C, as shown by Groschner, et al. in FIG. 32. According to these authors, the composition of the eutectic point is Ni—68.25 weight %, Mo—29.50 weight %, C—2.25 Weight %. The eutectic point defines the lowest temperature at which the liquidus (the lowest temperature at which an alloy is completely liquid) and solidus (the highest temperature at which an alloy is completely solid) are the same. At compositions away from that point, the solidus remains the same, but the liquidus temperature increases. At temperatures less than this eutectic temperature there will be found, under equilibrium conditions, at least two of three solid phases, one of a nickel-molybdenum-carbon solid solution, one of a carbide of molybdenum ($Mo_2C$) and one of carbon (probably in the form of graphite).

Figure 34:
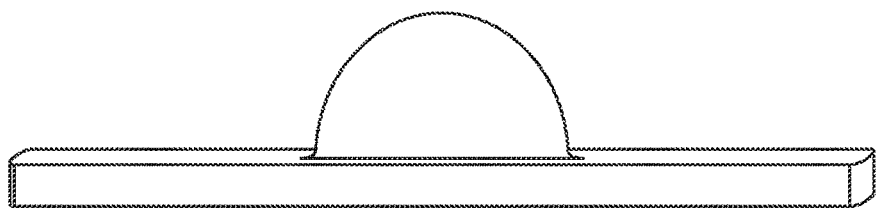
FIG. 34 is a C—Ni—Mo Eutectic alloy sessile drop on AlN.

These various Ni—Mo—C alloy compositions in the neighborhood of the eutectic composition, when heated above the eutectic melting temperature (the solidus plane) to about 1280 C in a high-vacuum atmosphere, will partially melt, wet to a certain degree and bond tightly to AlN. This was determined by the present inventors by mixing individual powders of Ni, Mo, and C (graphite) in ratios close to the above, pressing pellets, placing the pellets on pieces of AlN, placing these assemblies inside a Mo sheet can, placing this within a high-vacuum, high-temperature furnace and heating them under a high vacuum. Temperatures ranging from 950 C to 1350 C have been explored. At various temperatures, depending upon composition, the pellets melted to various degrees and bonded tightly to the AlN. A powder mixture of Ni—76.3 Wt %, Mo—21.1 Wt %, and graphite—2.6 Wt % pressed into pellets and placed on AlN sheets was high vacuum heat treated to 1275 C. On cooling some reaction and melting was observed, but it was incomplete. Heating again to 1280 C resulted in complete melting and formation of a Sessile Drop on the AlN sheet. This is shown in FIG. 34.

An experiment was designed to braze a pellet of a Ni-alloy/diamond-based MMC within an AlN plate utilizing this braze alloy. It consisted of placing the MMC, which had been coated with a powder mixture of Ni—76.3 Wt %, Mo—21.1 Wt %, and graphite—2.6 Wt %, into a hole drilled in an AlN plate. The plate was placed on a thin sheet of AlN. This was then heated as described above. Again, the alloy composition melted and bonded tightly to the AlN.

Both the Ni—2 Wt % Cg and the Ni—Mo-Cg alloy, since they utilize high concentrations of Ni, may be suitable for bonding Ni and nickel-based metal alloys where Ni is the major constituent. To examine this we placed between two, 0.050 inch thick pieces of Ni 200 sheet, a relatively pure grade of commercially available nickel, a piece of the Ni—2 Wt % Cg foil onto which we had sputtered Mo. This sandwich assembly was heated at 1280 C while in a high-vacuum environment and under a force of about 400 psi pressure. The Nickel pieces were strongly bonded together. In another experiment the Ni—Mo—C alloy foil was used successfully to braze a piece of Ni 200 sheet to a piece of Hastalloy X (a commercially available Superalloy) plate.

Figure 37:
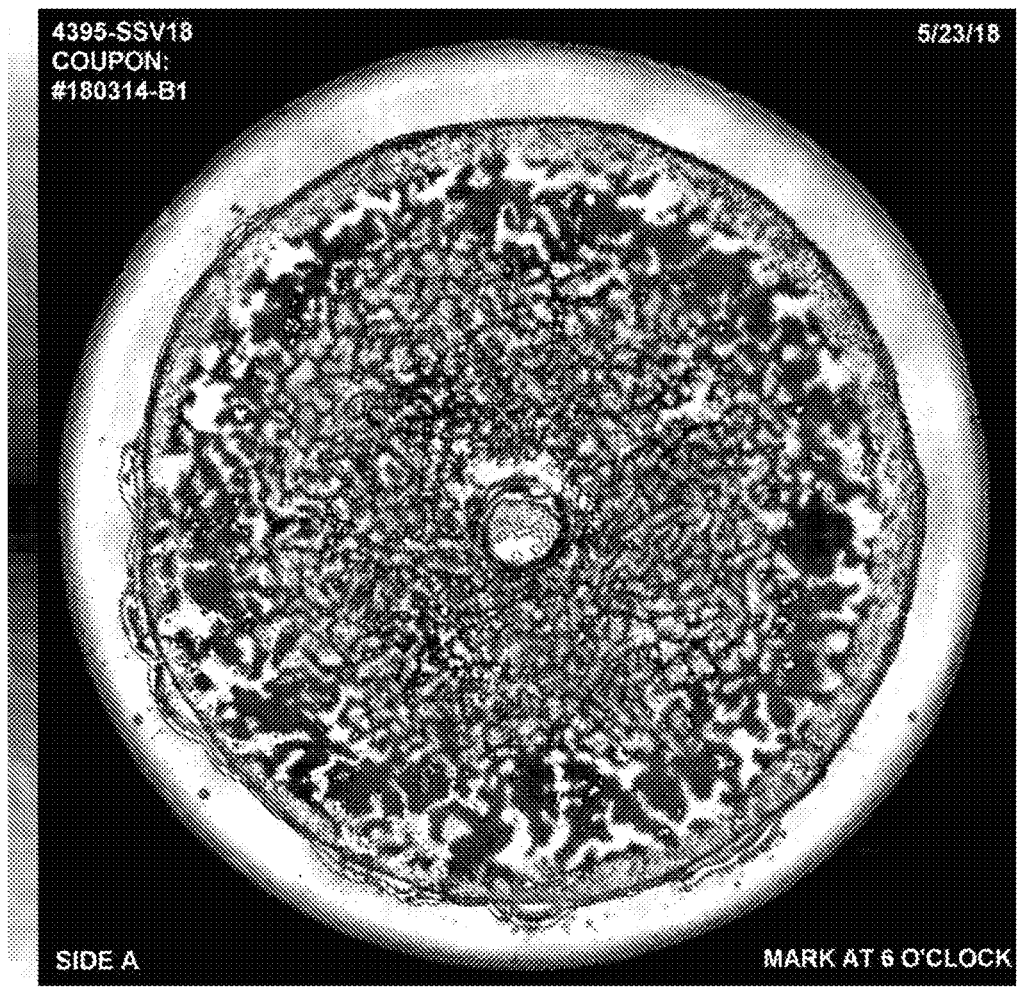
FIG. 37 is a sonogram of a Ni—Mo-Cg/AlN brazed joint.
Figures 39A, 39B:
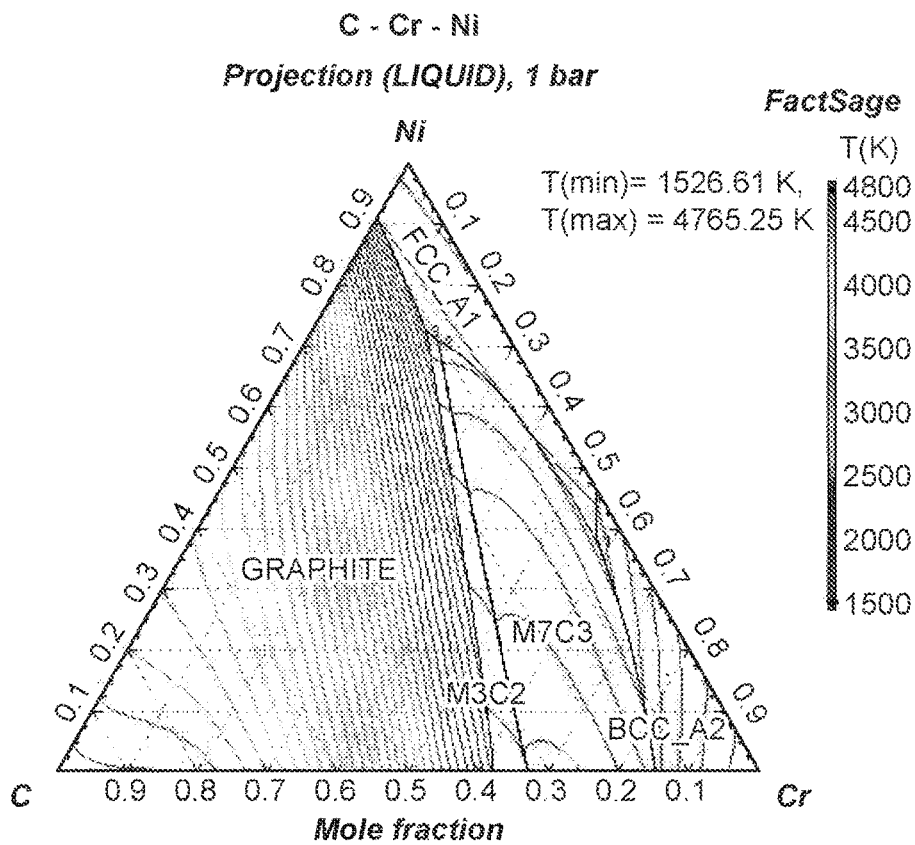
FIG. 39A is a ternary phase diagram for C—Cr—Ni.
FIG. 39B are phase intersection points and other information pertaining the ternary phase diagram of FIG. 39A.
Figures 40A, 40B:
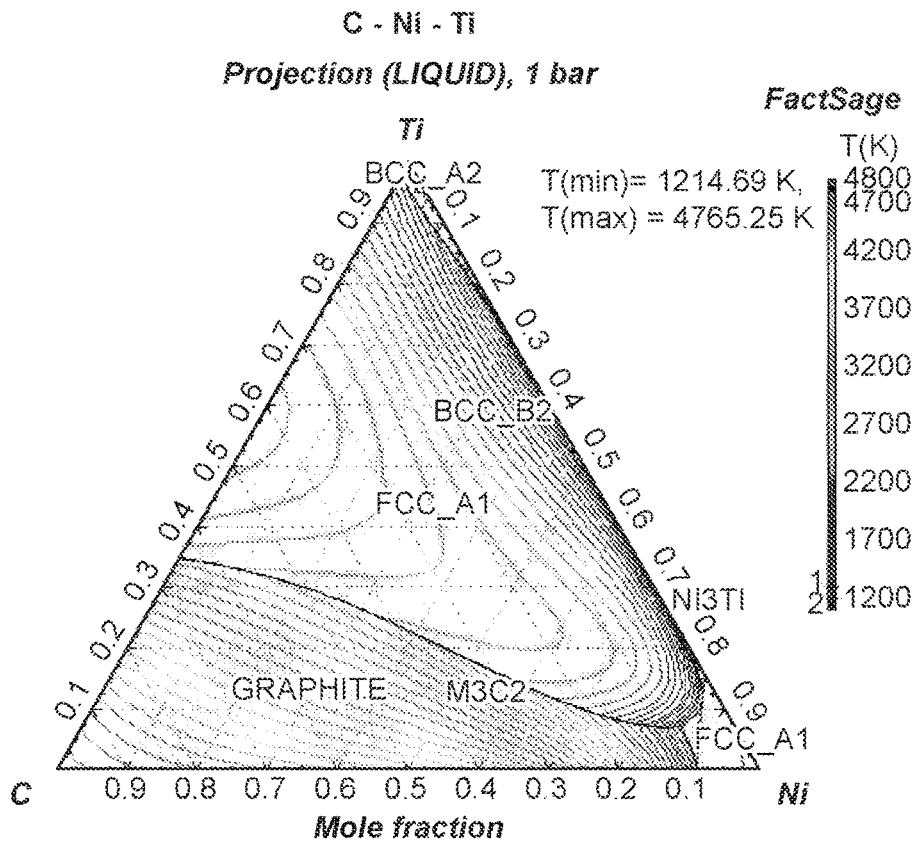
FIG. 40A is a ternary phase diagram for C—Ni—Ti.
FIG. 40B are phase intersection points and other information pertaining the ternary phase diagram of FIG. 40A.
Figures 41A, 41B:
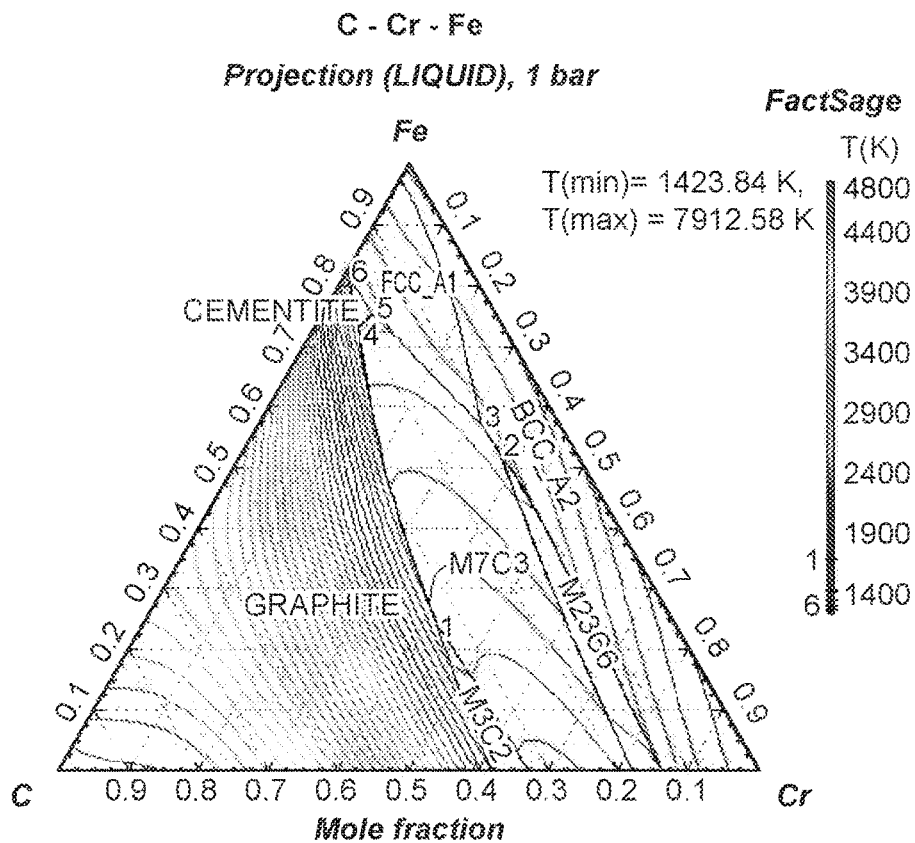
FIG. 41A is a ternary phase diagram for C—Cr—Fe.
FIG. 41B are phase intersection points and other information pertaining the ternary phase diagram of FIG. 41A.
Figure 42A:
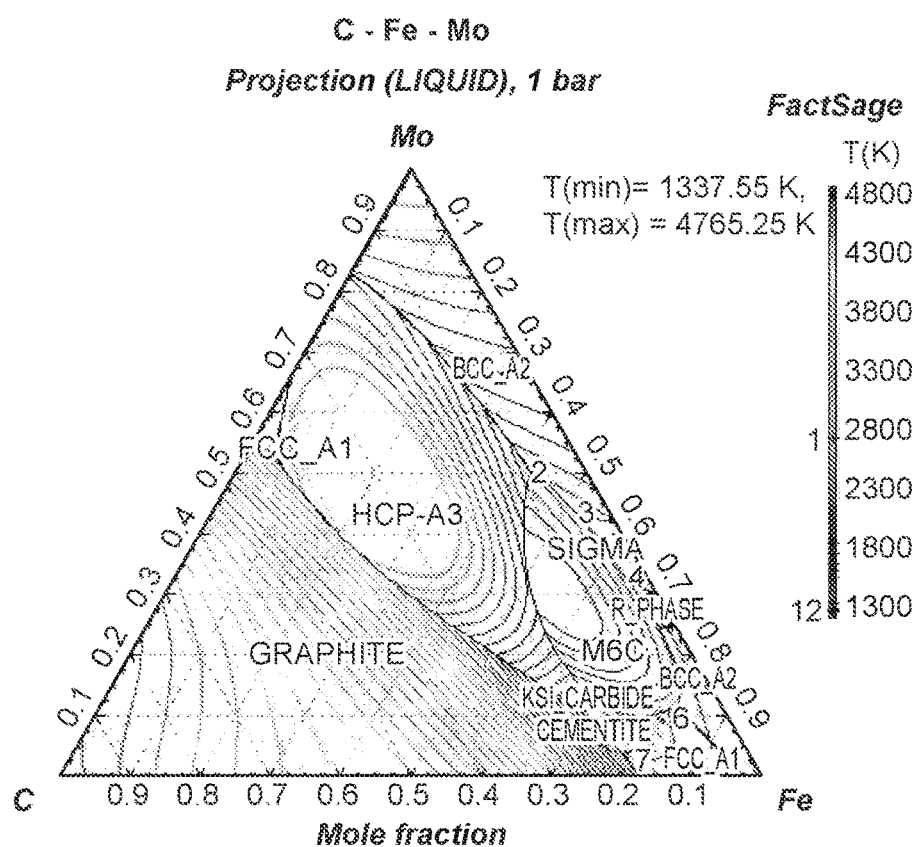
FIG. 42A is a ternary phase diagram for C—Fe—Mo.

The bonding experiment of placing foil between two AlN pucks was repeated yet again, but with somewhat different materials. In this experiment the Ni—2 Wt % Cg foil was sputter-coated with 15μ of Mo on both sides and the sample was heated to 1350 C for 20 min. (sample #180312-B2). Again, the alloy composition melted and bonded tightly to the AlN. A Sonoscan, an ultrasonic evaluation of the braze joint, is shown in FIG. 37.

Figure 30:
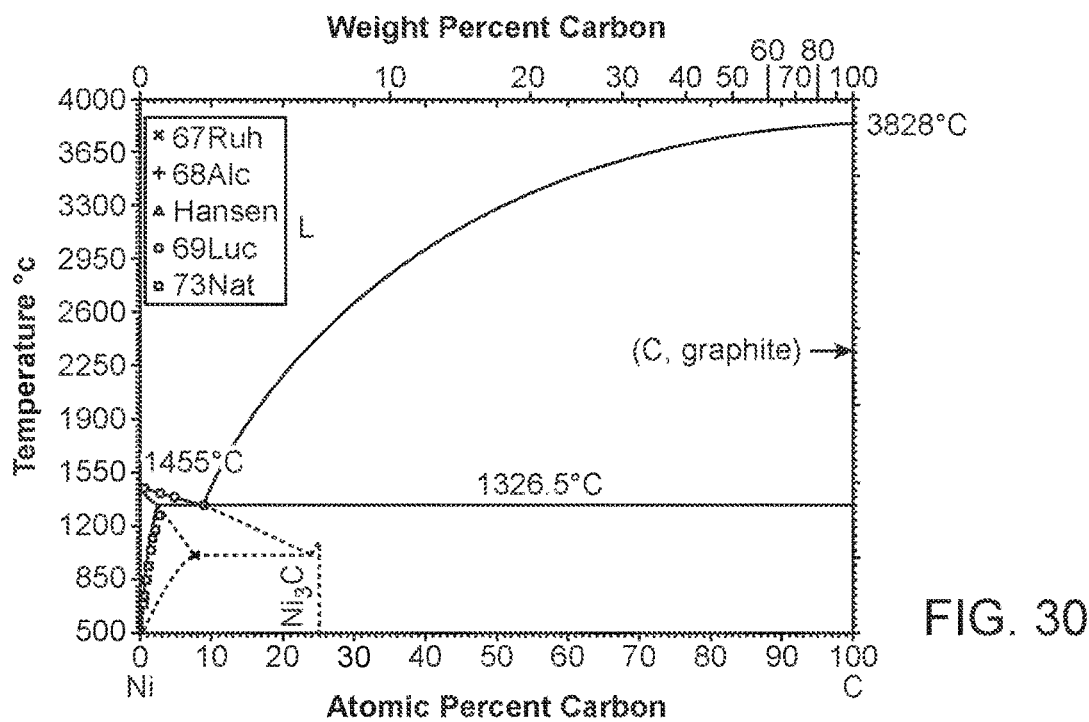
FIG. 30 is a Ni—C and Ni—NiNi$_2$C phase diagram.

Experiments have been carried out exploring the melting and bonding to AlN of samples of mixed powders of Ni with Mo and Cg which exhibited characteristics of the metastability indicated in FIG. 30. These samples melted at significantly lower temperatures, as low as 1025 C, with some samples showing indications of a liquid phase present at 975 C.

The formation of the Ni—Mo—C alloys may take place using a variety of different processes. They may be arc-melted and subsequently rolled into foil to provide a sheet of braze filler material as mentioned above, or they may consist of mixed powders as used above, but also spread out into thin sheets of braze filler material. Alternatively, the various elements may be evaporated, sputtered, formed via CVD processes or other techniques into thin films either simultaneously or in layer-by-layer fashion to achieve the desired braze thickness and composition. As an example, onto AlN substrates we have formed an amorphous carbon (diamond-like-carbon) layer of 1.2 micron thickness using CVD, followed by sputtering a Ni layer of 9.1 micron thickness, followed by sputtering a Mo layer of 4.7 micron thickness. We placed two such coated AlN substrates with the coatings face-to-face into a high-vacuum furnace and heat treated them at 1200 C for two hours to alloy them and then heated them to 1275 C for 20 minutes to form a eutectic liquid phase, brazing the AlN substrates together.

In some aspects, the processes described in are brazing processes. In some aspects, they may be viewed as transient liquid phase bonding processes. In the embodiments with distinct sputtered layers, for example, they may be viewed as transient liquid phase bonding processes. Although the eutectic compositions are discussed using atomic percentage of the constituents, in some aspects the individual constituents are deposited in separate layers. The separate layer thicknesses will be selected such that the atomic percentages of each constituent as a percentage of the whole are maintained.

Figure 47:
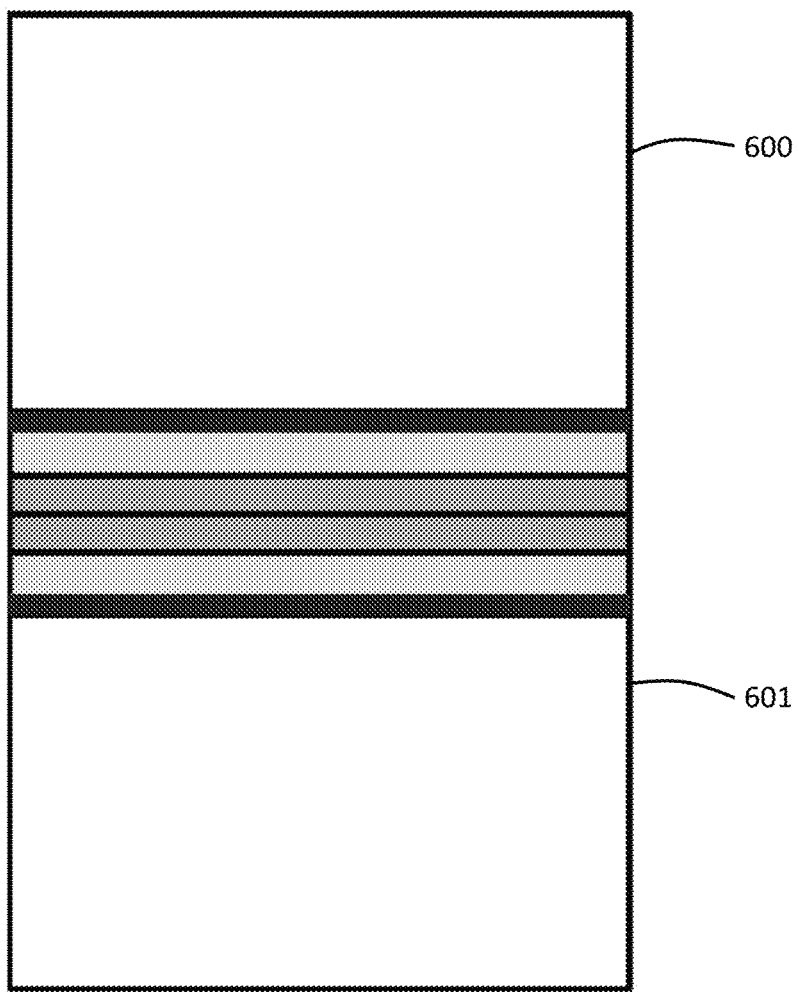
FIG. 47 is a cross-sectional view of two pieces pressed together and ready for joining according to some embodiments of the present invention.

In an exemplary embodiment of a process according to the present invention, as seen in FIG. 47, a first piece 600 will be joined to a second piece 601. In some aspects, the first piece is ceramic and is aluminum nitride or alumina. In some aspects, the second piece is ceramic and is aluminum nitride or alumina. An amorphous carbon layer 602 has been sputtered onto the joining surface of the first piece 600. Another amorphous carbon layer 603 has been sputtered onto the joining surface of the second piece 601. A nickel layer 604 has been sputtered onto the carbon layer 602. Another nickel layer 605 has been sputtered onto the carbon layer 603. A layer of Mo 606 has been sputtered onto the nickel layer 604. Another layer of Mo 607 has been sputtered onto the nickel layer 605.

Figure 48:
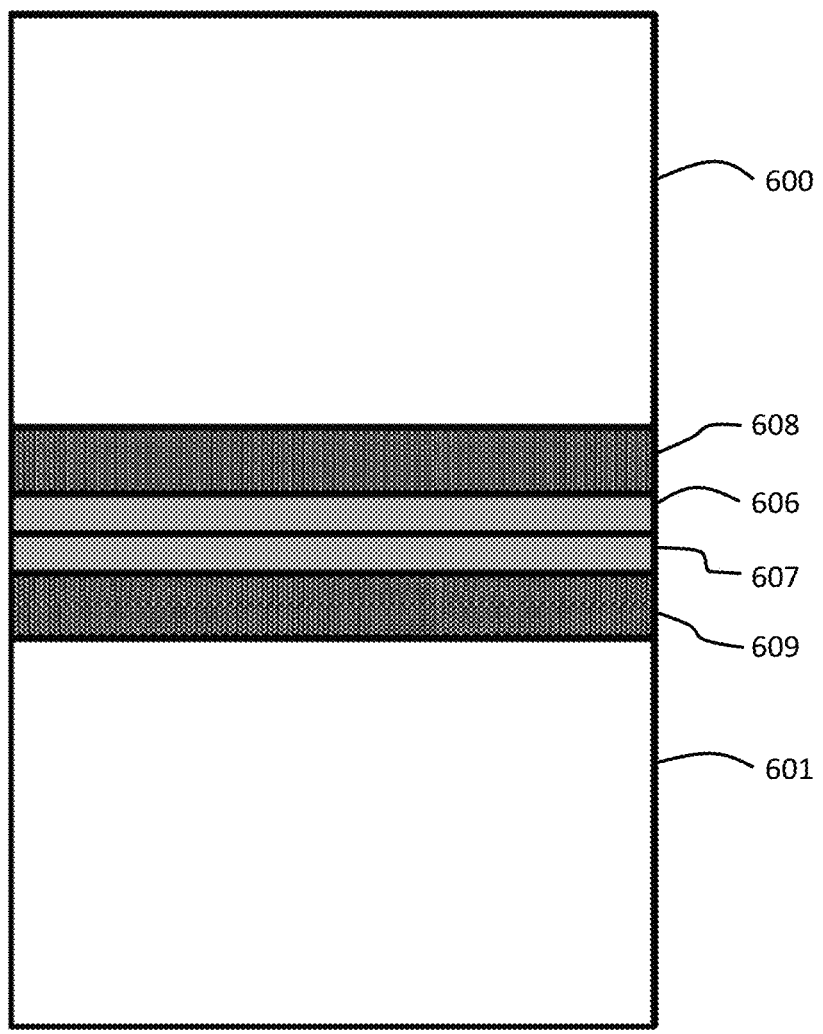
FIG. 48 is a cross-sectional view of an early stage of the joining process according to some embodiments of the present invention.
Figure 49:
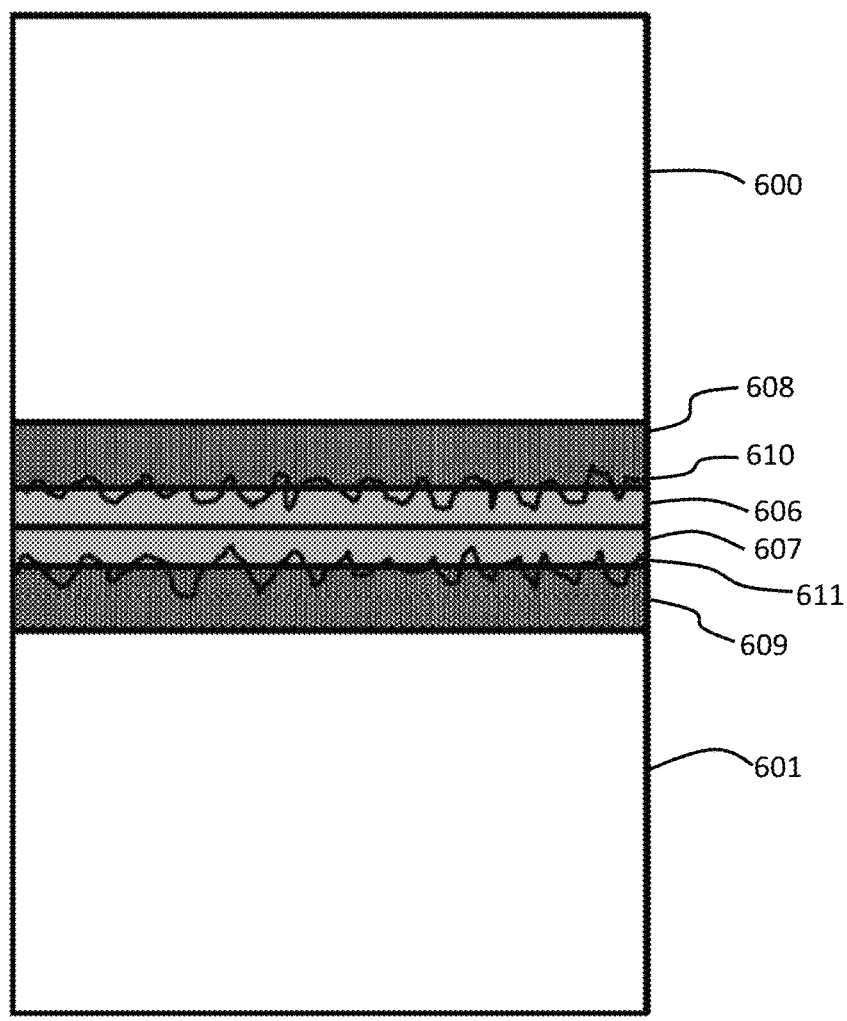
FIG. 49 is a cross-sectional view of an intermediate stage of the joining process according to some embodiments of the present invention.

FIG. 48 illustrates the first piece 600 and the second piece 601 as their Mo layers have been placed in contact prior to the heating step. The joining pre-assembly may be placed into a process chamber and brought to a high vacuum. In some aspects, the pressure is lower than 1×10E−4 Torr. In some aspects, the pressure is lower than 1×10E−5 Torr. The eutectic temperature for Ni—Mo—C is approximately 1250° C. In some aspects, a first heating step is used and the pre-assembly is taken to 1200° C. The first heating step may have a duration of 2 hours. As seen in FIG. 49, the carbon layer may diffuse into the nickel layer resulting in a Ni—C layer 608 on the first piece 600 and another Ni—C layer 609 on the second piece 601. A second heating step at or above the eutectic temperature is then undergone. In this example of a Ni—Mo—C joining material, the second heating step may be at 1275° C.

In some aspects, the joining process may use a two step heating process wherein the first heating step is below the eutectic temperature. In some aspects, the first heating step is below the eutectic temperature but within 100 C of the eutectic temperature. In some aspects, the first heating step is below the eutectic temperature but within 80 C of the eutectic temperature. In some aspects, the first heating step is below the eutectic temperature but within 60 C of the eutectic temperature. In some aspects, the first heating step is below the eutectic temperature but within 40 C of the eutectic temperature. The second heating step is then at or above the eutectic temperature.

Figure 50:
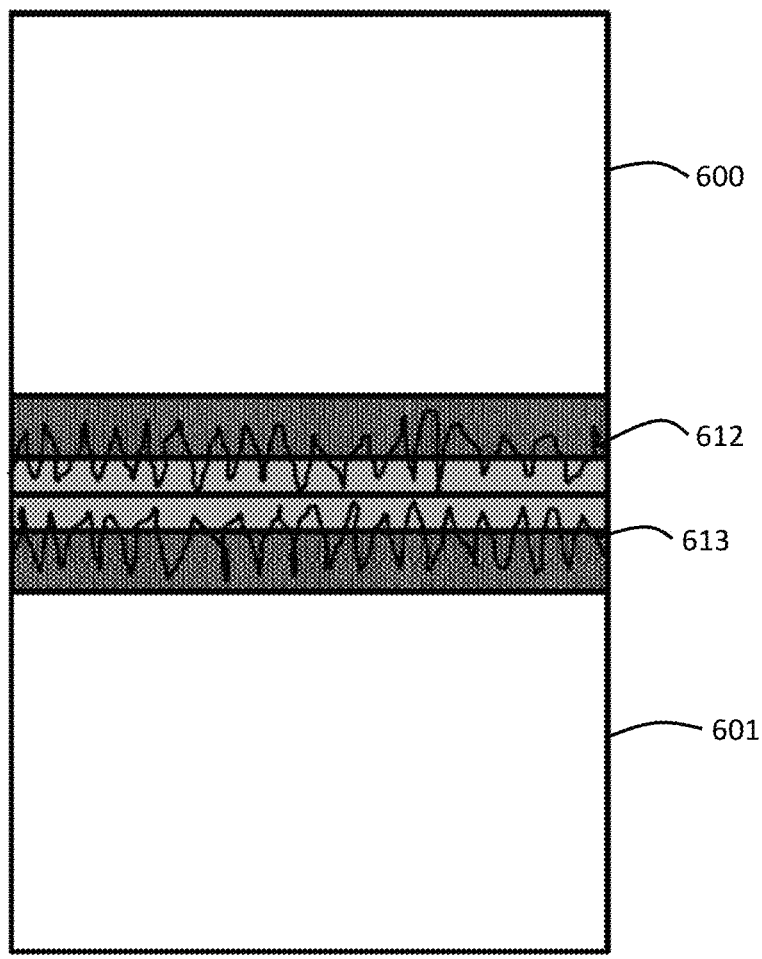
FIG. 50 is a cross-sectional view of a later intermediate stage of the joining process according to some embodiments of the present invention.
Figure 51:
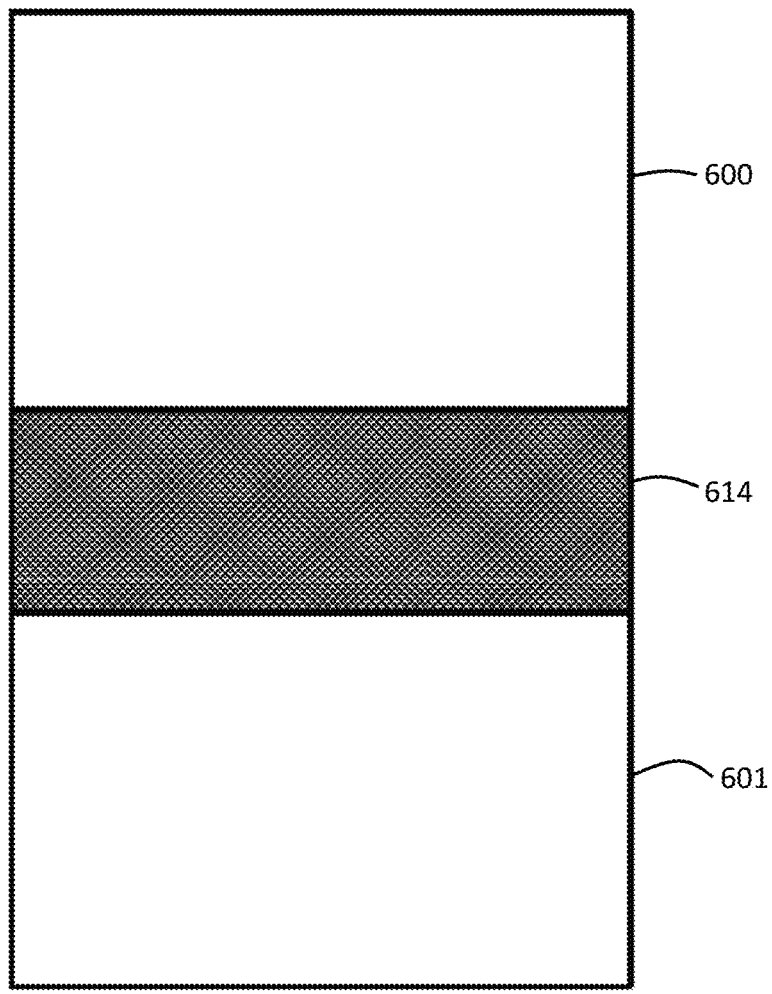
FIG. 51 is a cross-sectional view of a joint according to some embodiments of the present invention.

As the temperature is raised to or above the eutectic temperature, as seen in FIG. 50, a melting will begin at the interface of the Ni—C layer 609 and the Mo layer 607. The melting 610 at the junction of the Ni—C layer 609 and the Mo layer 607 will result from compositions at or near the eutectic composition will melt, and this melting will continue to move at from the junction. Similarly, a melting 611 will begin at the interface of the Ni—C layer 608 and the Mo layer 606. FIG. 51 illustrates the process further along in time as the upper melting 612 and the lower melting 613 have expanded. The second heating step may have a duration of 20 minutes. In some aspects, a single heating step may be used at or above the eutectic temperature.

At the completion of the heating step, the joining assembly may be cooled. The first piece 600 is now joined to the second piece 601 with a joint 614. In some aspects, the joint is uniform. In some aspects, there may be some nickel remaining, although it may be saturated with Mo and C.

Figure 45:
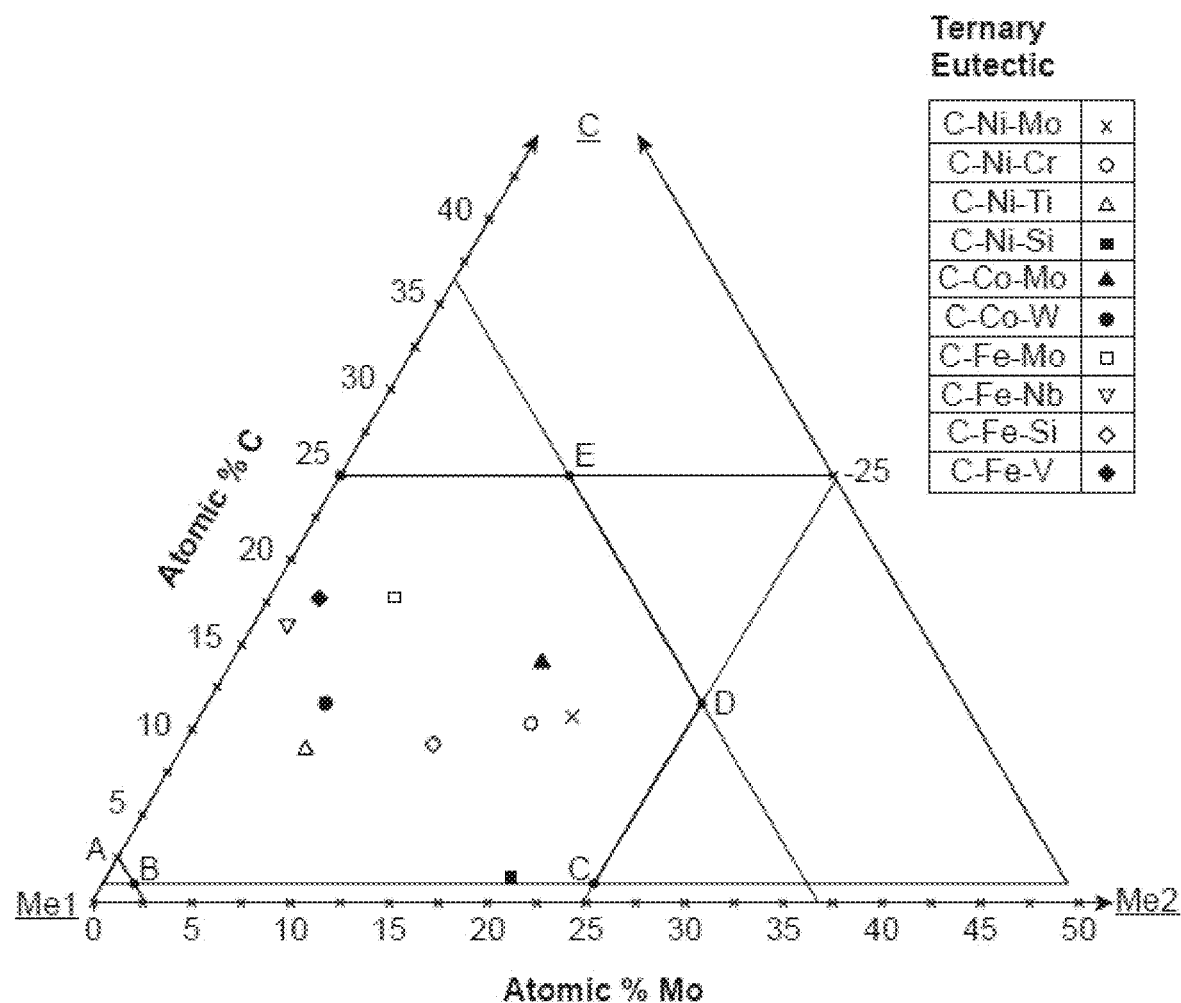
FIG. 45 is a phase diagram for C-Me1-Me2 ternary alloys according to some embodiments of the present invention.
Figure 46:
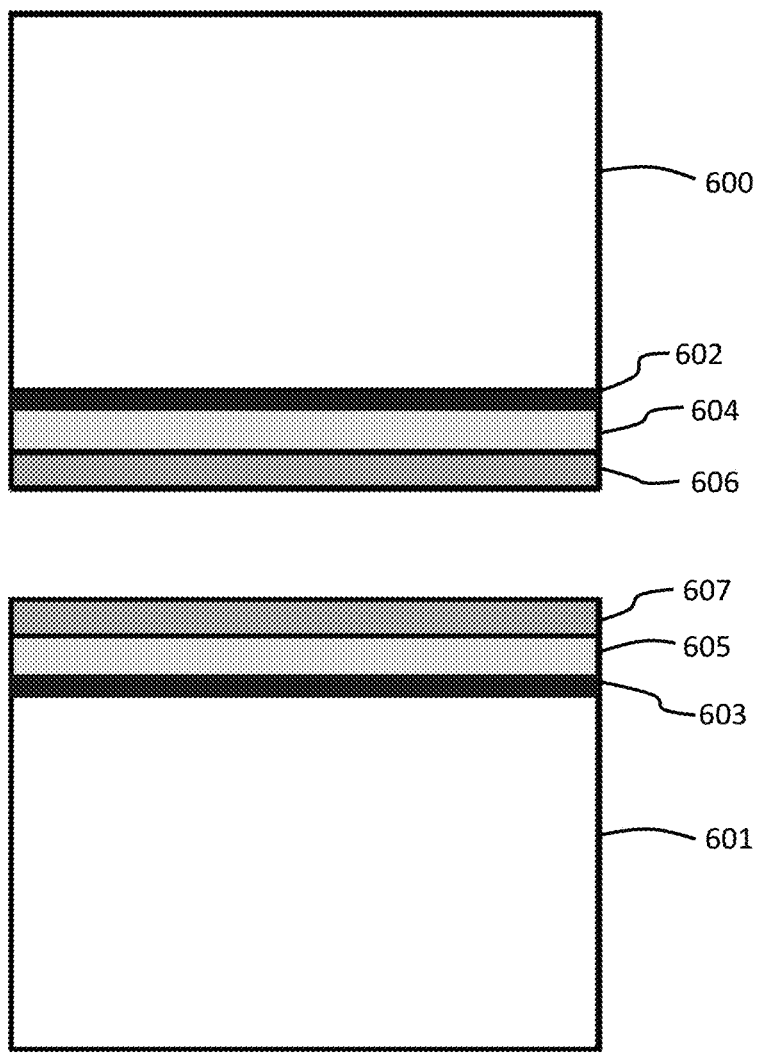
FIG. 46 is a cross-sectional view of two pieces ready for joining according to some embodiments of the present invention.

Although discussed above with a Ni—Mo—C eutectic, similarly other constituents may be used. FIG. 44A displays a table of Nickel-Carbon, Cobalt-Carbon, and Iron-Carbon systems which use additional alloying constituents. In each system, Carbon is used in the composition and there is a eutectic temperature at eutectic compositions illustrated in the table. FIG. 44B includes ranges for braze materials according to embodiments of the present invention, including a narrower range and a wider range for the atomic percentages of the constituents, as seen. In some aspects, the joining material will be within the narrower range of constituent atomic percentages. In some aspects, the joining material will be within the wider range of constituent atomic percentages. FIG. 45 shows a Me1-rich portion of a generalized ternary phase diagram for the Carbon-me1-Me2 systems, as well as a ternary eutectic table illustrating the eutectic points for the eutectic compositions shown in FIG. 44A. The polygon bounded by the lines joining points A-B-C-D-E-F of FIG. 45 illustrates the range of compositions that may be used according to some embodiments of the present invention. The lines AB and DE each represent constant compositions for Carbon, and line CD and AF each represent constant compositions for Me2. The range of compositions for Me1 (Ni, Co, Fe, or mixtures thereof) extend from about 63 atomic % to about 98 atomic %, while the range of compositions for Me2 extend from 0 atomic % to about 25 atomic %, and range of compositions for carbon (C) extend from about 0.5 atomic % to 25 atomic %.

Figure 35:
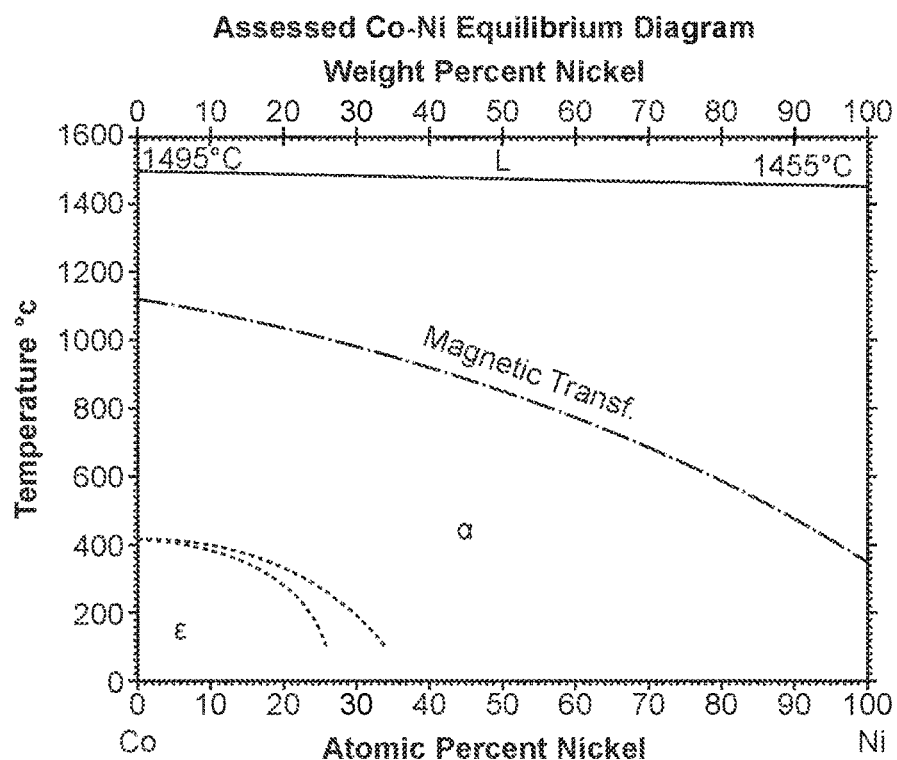
FIG. 35 is a Co—Ni phase diagram.
Figure 36:
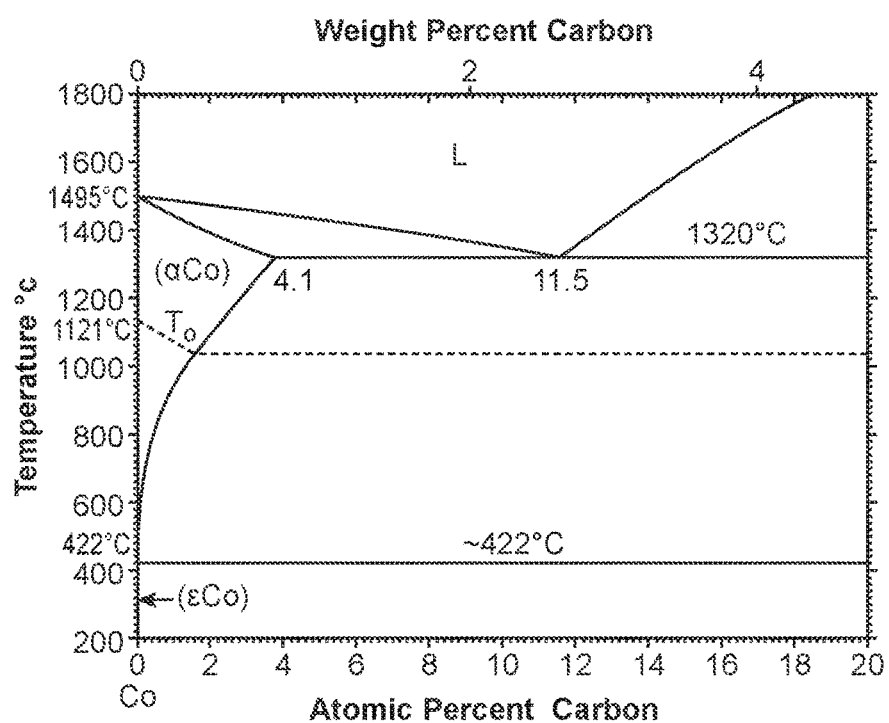
FIG. 36 is a Co-rich portion of a C—Co phase diagram.

Cobalt is an element chemically quite analogous to nickel. The Ni-Cobalt binary equilibrium phase diagram is shown in FIG. 35. The system Ni-Cobalt forms a continuous series of solid solutions, that is, Co substitutes directly for Ni in the crystalline lattice structure with no formation of separate, distinct chemical compounds. Thus one expects that partial to complete substitution of Co for nickel in any chemical interaction will give similar results, but the results will exhibit somewhat different compositions and properties—different melting temperatures, different electrical behavior, etc. The C—Co phase diagram discussed by Ishida and Nishizawa, J. Phase Equilibria, 12 (4) 1991, is shown in FIG. 36. Note the similarity with the Ni—C phase diagram. Indeed, the Co—Mo—C phase diagram exhibits behavior similar to the Ni—Mo—C system, as shown by M. Groschner, et al, in the paper cited above.

Figure 52:
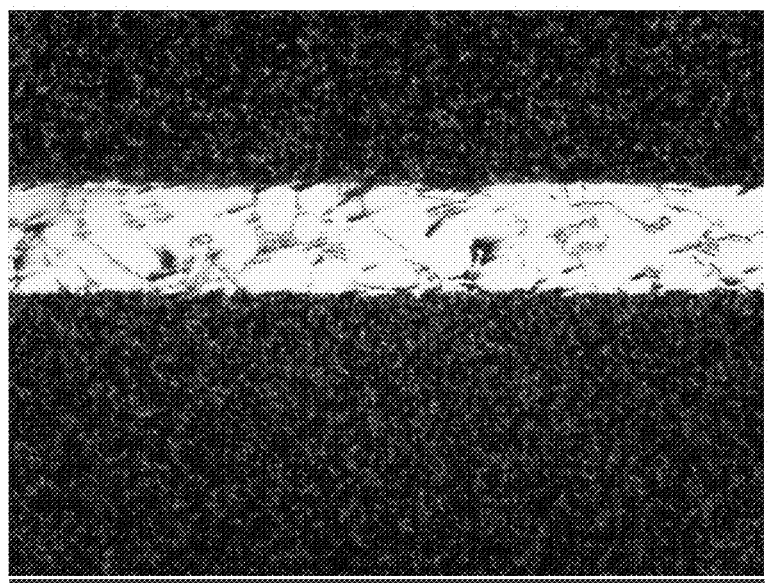
FIG. 52 is an optical photomicrograph of a braze joint between AlN ceramic plates according to some embodiments of the present invention.
Figure 53:
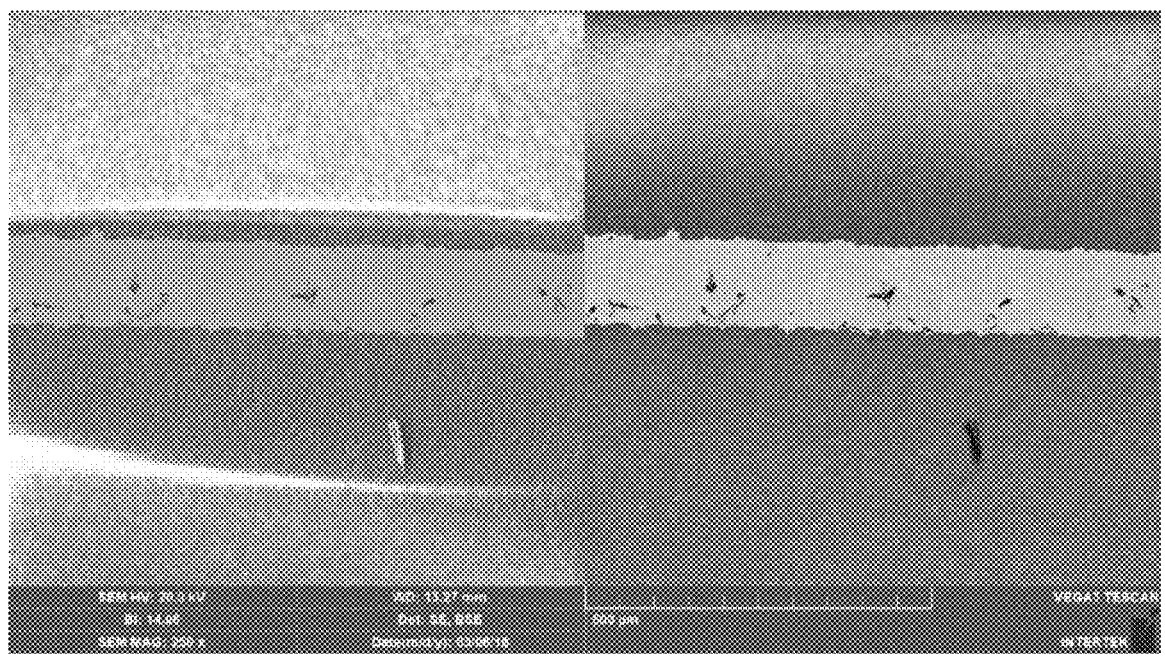
FIG. 53 is low magnification SEM photomicrographs of C—Ni—Mo brazed AlN ceramics according to some embodiments of the present invention.
Figures 54, 55:
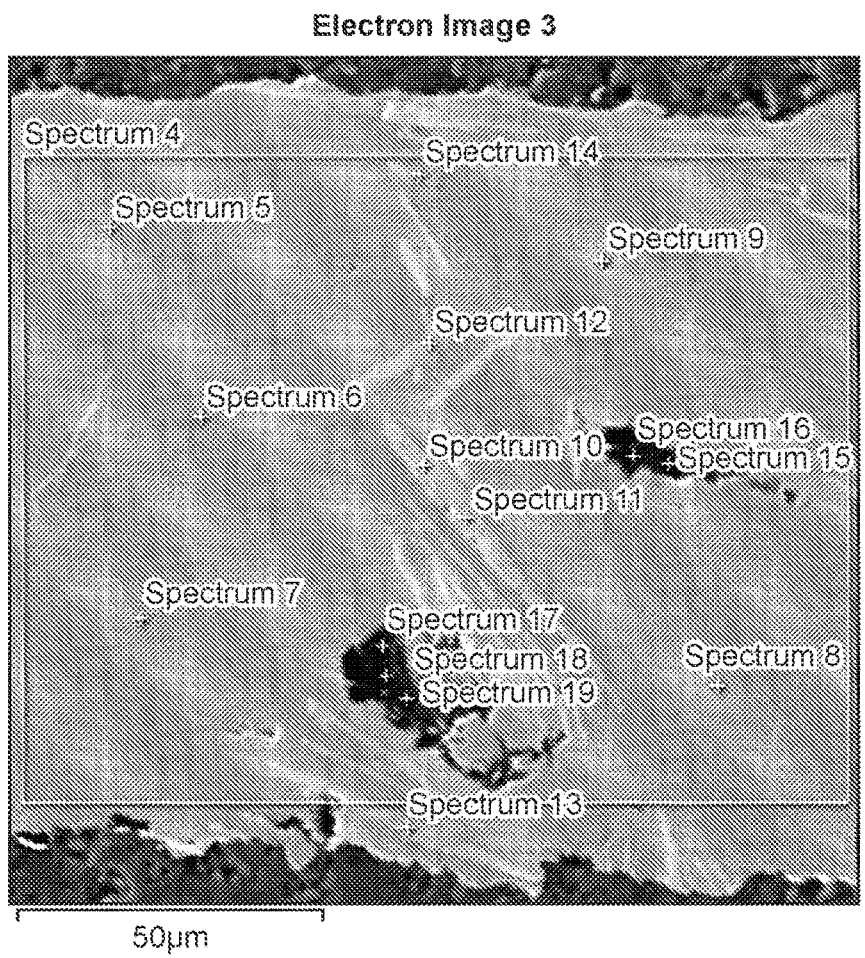
FIG. 54 is a higher magnification SEM photomicrograph of a braze joint between AlN ceramic plates according to some embodiments of the present invention.
FIG. 55 is SEM EDX data showing compositions of the phases present in a C—Ni—Mo braze according to some embodiments of the present invention.

We have explored this to some extent by substituting Co for Ni by 50 weight % in experiments with mixed powders of (Ni,Co)—Mo—Cg similar to the above. In another exemplary embodiment, a thin pressed pellet of a powder composition of 42.3 atomic % Ni, 42.3 atomic percent Co, 7.9 atomic percent Mo, and 7.5 atomic percent C, along with a thin pressed pellet of 84.6 atomic percent Ni, 7.9 atomic percent Mo, and 7.5 atomic percent C, was used to join two AlN pieces. The first AlN piece had 4 weight % Y2O3, and the second AlN piece was 99.7% pure AlN. The assembly was high vacuum heat treated at 1000° C. for two hours in a first heating step, and then 20 minutes at 1075° C. in a second heating step. FIG. 52 is an optical photomicrograph of the braze joint showing the grain structure and some of the phases present in the braze alloy. FIG. 53 shows low magnification SEM images of the brazed joint exemplifying the joint's uniformity, while FIG. 54 shows a higher magnification of the braze joint with areas examined chemically using EDX. FIG. 55 shows the result of the EDX analysis of the braze alloy. There are three distinct phases: 1) the matrix phase containing primarily Ni and Co with small amounts of Mo and C in solid solution, 2) a light phase consisting primarily of Mo, and 3) a dark phase consisting primarily of C. All three phases showed evidence of dissolved Al, indicating slight reaction with the AlN.

Both the Ni—2 Wt % Cg and the Ni—Mo—Cg alloy, since they utilize high concentrations of Ni, should be suitable for bonding Ni and nickel-based metal alloys where Ni is the major constituent. To examine this we placed between two, 0.050 inch thick pieces of Ni 200 sheet, a relatively pure grade of nickel commercially available, a piece of the Ni—2 Wt % Cg foil onto which we had sputtered Mo. This sandwich assembly was heated at 1280 C while in a high-vacuum environment and under a force of about 400 psi pressure. The Nickel pieces were strongly bonded together. In another experiment the Ni—Mo—C alloy foil was used successfully to braze a piece of Ni 200 sheet to a piece of Hastalloy X (a commercially available Superalloy) plate.

Figure 38:
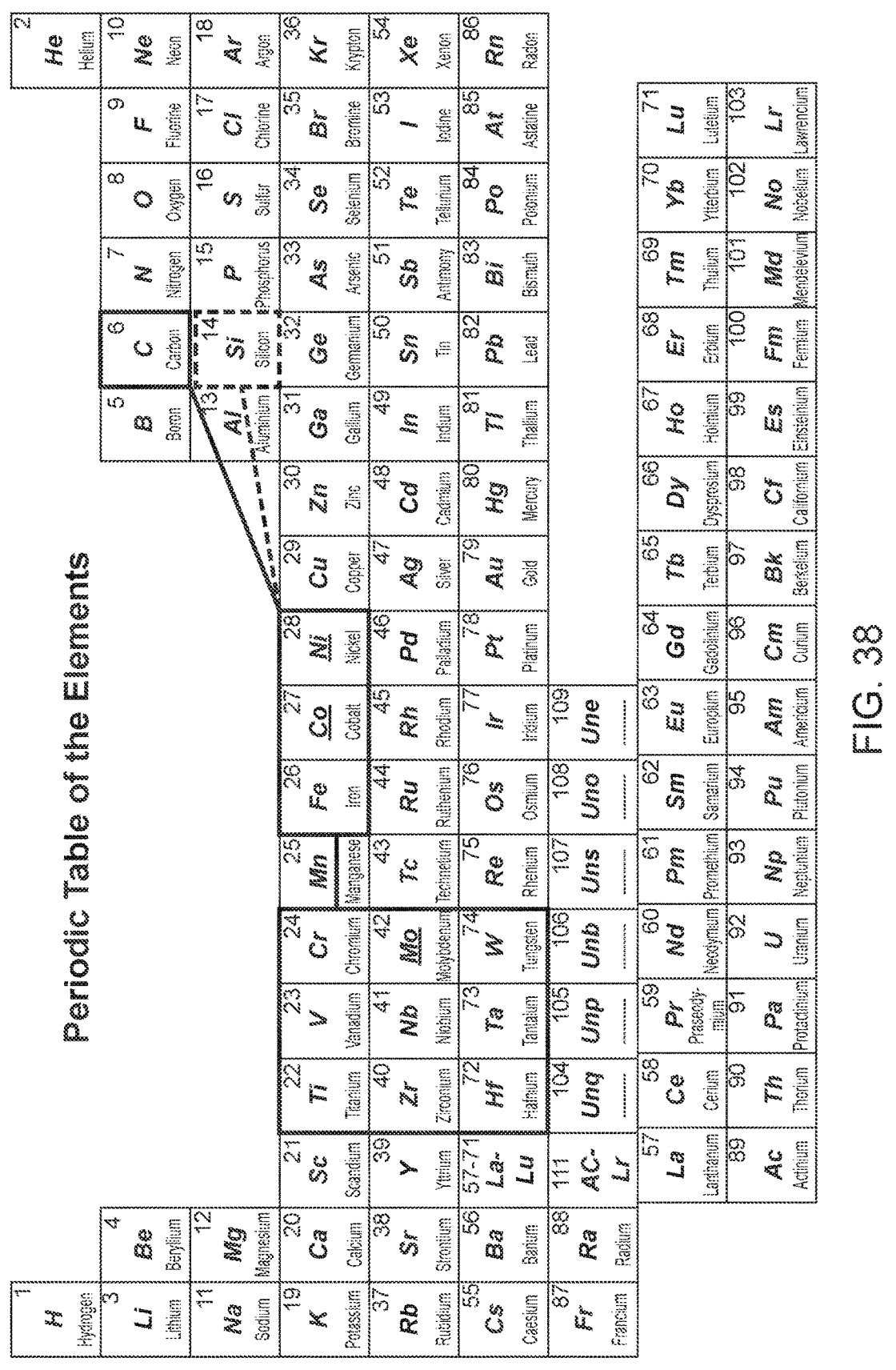
Figures 43A, 43B:
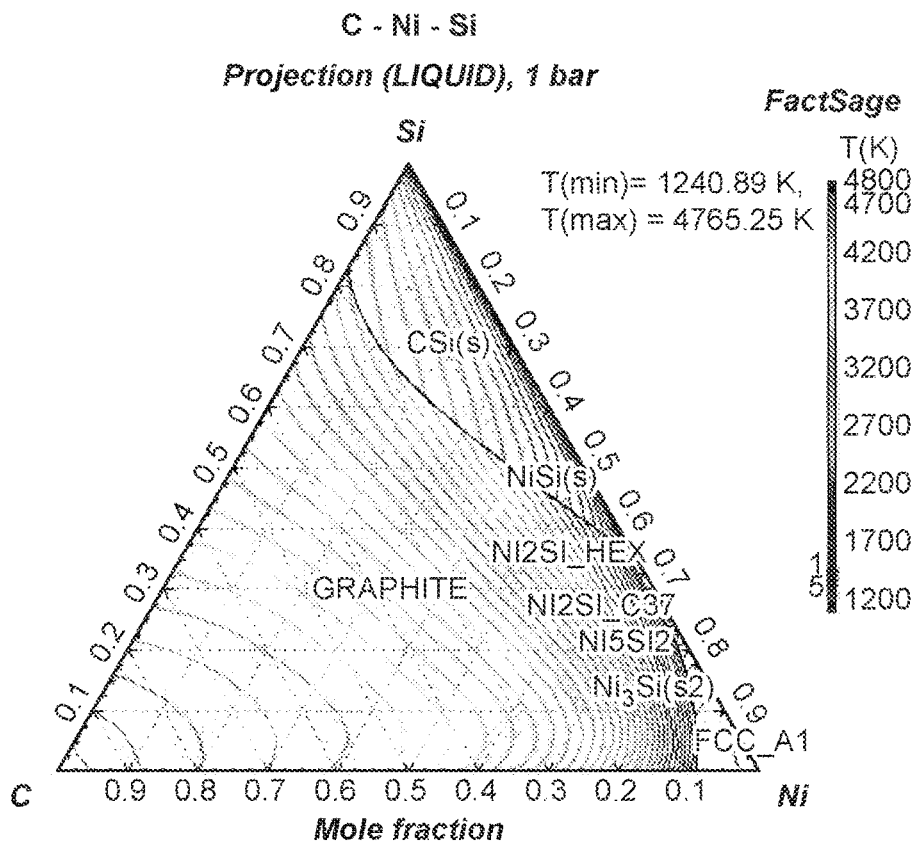
FIG. 43A is a ternary phase diagram for C—Ni—Si.
FIG. 43B are phase intersection points and other information pertaining the ternary phase diagram of FIG. 43A.

A broader category of alloy systems may have similar melting characteristics and may be used as described above. The group IVB, VB and VIB transition metal elements all form carbides, and in combination with Fe, Ni, Co and C they may form low melting eutectics which could be used as brazing filler metal alloys. This grouping in the Periodic Chart of the Elements is shown in FIG. 38. Ternary phase diagrams for the systems Ni—Cr—C, Ni—Ti—C, Fe—Cr—C and Fe—Mo—C are shown in FIGS. 39A, 40A, 41A and 42A respectively. Also, there is the Ni—Si—C system, the phase diagram for which is shown in FIG. 43A. In each of the tables of FIGS. 39B-43B, the phase intersection points of the respective phase diagram of FIGS. 39A-43A are listed numerically, and the location of each numerically listed phase point is shown on the respective phase diagram of FIGS. 39A-43A with the number of that phase point. The ternary phase diagrams have isotherm lines indicating temperatures, which are typically descending towards phase intersection points.

As discussed above, Nickel(Ni)-Carbon as graphite(Cg) alloys, Ni—Cg-Molybdenum(Mo) alloys, and Ni-Cobalt (Co)-Cg—Mo alloys have been found to be suitable for brazing together ceramics, ceramics to metals, and metals to metals. The use of such alloys in the manufacture of semiconductor processing equipment, for the joining of ceramics, allows for support of processing at high temperatures while being resistant to semiconductor processing chemistries. These semiconductor processing chemistries may include halogen, bromine, chlorine, fluorine, and compounds thereof. In addition, the use of such alloys in the manufacture of industrial processing equipment, as discussed below, allows for manufacture of equipment which may support of operations at high temperatures.

In semiconductor manufacturing, high-energy gas plasma, which is both corrosive and high temperature, is used to effect processing necessary in the making of integrated circuits. In many applications, components are used in the processing environment to contain and direct the plasma. Typically these components, commonly called edge rings, focus rings, gas rings, gas plates, blocker plates, etc., are made from quartz, silicon, alumina, or aluminum nitride. It is not uncommon for these components to have lifetimes measured in hours, as the erosion of the parts by the plasma causes process drift and contamination, requiring replacement of the components after short service times. In some applications, the plasma is injected into the processing environment by use of an array of ceramic nozzles. These nozzles are monolithic parts, with complex geometries, and with a small orifice on the order of 0.010" diameter for controlling the flow rate and pattern of the plasma. Typical materials for these nozzles are aluminum oxide or aluminum nitride. Even with the use of these advanced ceramics, lifetime of the nozzles is 3 months due to erosion of the orifice by the high energy plasma. This requires that the machine be completely shut down every three months to replace the nozzle array, typically comprising more than 20 individual nozzles. While the nozzles are being eroded, they release contaminants into the plasma that reduce yields of the processing. And as the nozzles approach their end-of-life, the flow of the plasma begins to increase due to erosion of the orifice, which causes the process performance to change, further reducing yields. Other advanced ceramic materials have significantly lower erosion rates in that plasma environment, such as sapphire and yttrium oxide. If components such as edge rings and injector nozzles could be made with these materials, significant lifetime and performance improvements would result. However, the manufacturing and cost limitations mentioned above, limit the use of such materials for this application. What is needed is a method to utilize the properties of the best materials with a cost near that of the current materials.

Aspects of the current invention provide a method to combine the properties of the best materials for erosion and corrosion such as sapphire (mono-crystalline aluminum oxide), yttrium oxide, and partially-stabilized zirconium oxide (PSZ), with the lower cost advanced ceramic materials such as aluminum oxide. Utilizing methods according to embodiments of the present invention, which uses aluminum as a brazing material for joining advanced ceramic materials to themselves and other materials, it is now possible to join the properties of the highest performing advanced ceramic materials with the costs and manufacturability of the lower cost and simple manufacturability of ceramics such as alumina. Such processes produce joints with high levels of corrosion and erosion resistance, which can operate at elevated temperatures, and which can withstand significant variations in thermal expansion between the joined materials.

Figure 10:
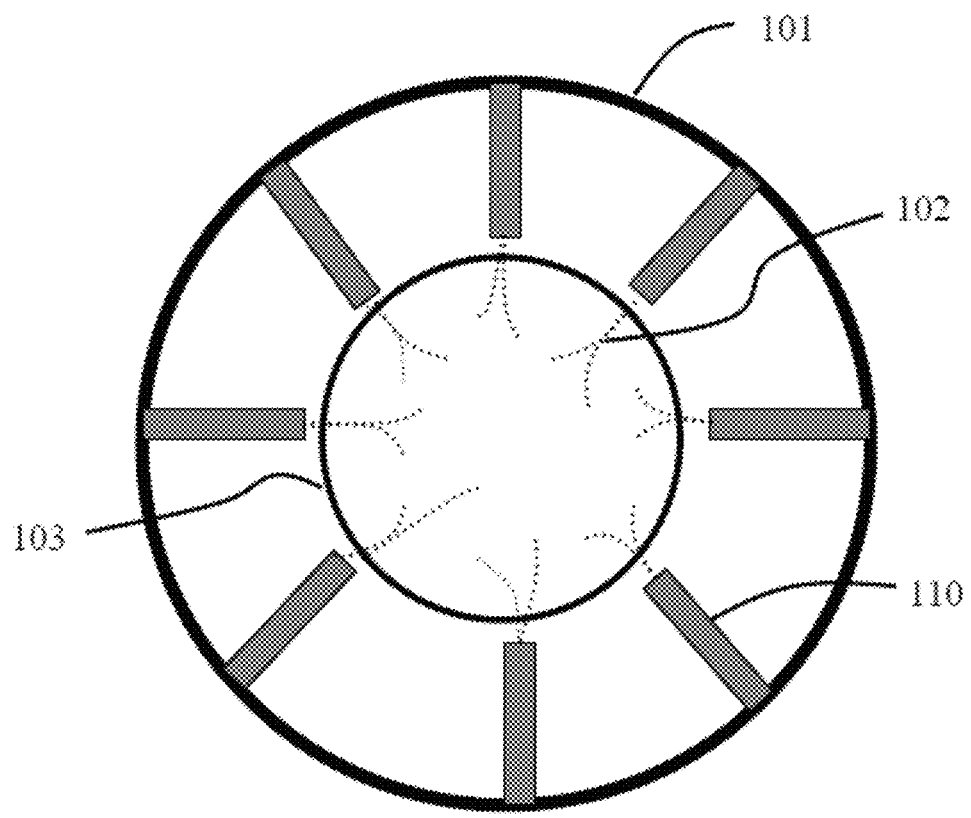
FIG. 10 is a drawing of a gas distribution ring around a wafer.
Figure 11:
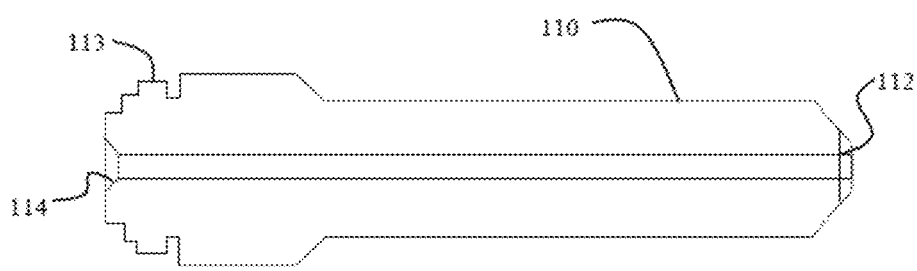
FIG. 11 is a drawing of a gas injection nozzle.

FIG. 10 illustrates a gas distribution ring 101 which is coupled to a plurality of CVD injector nozzles 110. The process is geared towards a substrate 103, which may be a semiconductor wafer. The outflow 102 from the injector nozzles 110 contributes to a processing of the substrate 103. FIG. 11 illustrates a CVD injector nozzle 110. The nozzle 110 has an interior passage 111 which ends at a passage exit 112 where the gas or other material which passes through the interior passage 111 exits the nozzle 110. The gas or other material enters the nozzle at a passage entrance 114. The injector nozzle 110 may have a mechanical interface 113 adapted to couple the injector nozzle 110 to the gas distribution ring 101.

Figure 12:
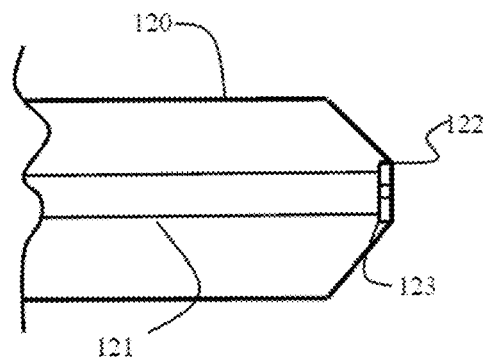
FIG. 12 is a drawing of the front portion of a gas injection nozzle according to some embodiments of the present invention.
Figure 13:
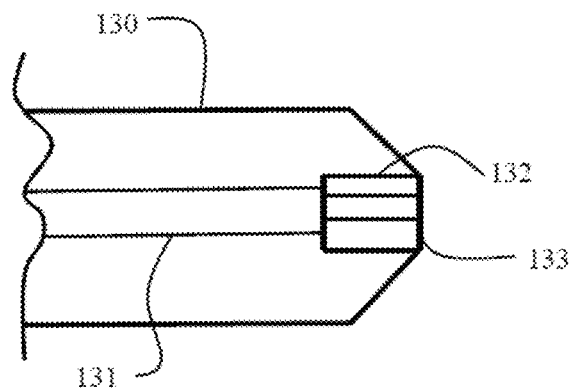
FIG. 13 is a drawing of the front portion of a gas injection nozzle according to some embodiments of the present invention.

FIGS. 12-13 illustrates CVD injector nozzles according to some embodiments of the present invention. In some embodiments of the present invention, as seen in FIG. 12, the fore end of a nozzle body 120 is seen with an interior passage 121. In some aspects, the nozzle body 120 is alumina. In some aspects, the nozzle body 120 is aluminum nitride. At the tip of the interior passage 121 there is disc 123 which resides in a counterbore at the front of the nozzle body 120. The disc 123 is a wear resistant material such as sapphire. The disc 123 may have an interior diameter which is less than the interior diameter of the interior passage 121. The disc 123 may be joined to the nozzle body 120 with a joining layer 122. The joining layer 122 may be of a braze alloy described herein. The disc 123 may be joined to the nozzle body 120 using a braze method described herein. The disc 123 may be joined to the nozzle body 120 with an braze layer 122 wherein there is no diffusion of the joining layer 122 into the nozzle body 120 or into the disc 123. In applications where the erosion of the nozzle occurs primarily at the tip of the nozzle, the use of the disc 123 comprising a wear resistant material, such as sapphire, allows for the use of a nozzle primarily manufactured from a low cost material, such as alumina, while gaining the benefit of the high wear and erosion resistance of a highly wear resistant material at an identified high wear area.

In some embodiments of the present invention, as seen in FIG. 13, the fore end of a nozzle body 130 is seen with an interior passage 131. In some aspects, the nozzle body 130 is alumina. In some aspects, the nozzle body 130 is aluminum nitride. At the tip of the interior passage 131 there is an interior sleeve 133 which resides within an enlarged portion of the interior passage at the front of the nozzle body 130. The interior sleeve 133 is a wear resistant material such as sapphire. The interior sleeve 133 may have an interior diameter which is less than the interior diameter of the interior passage 131. The interior sleeve 133 may be joined to the nozzle body 130 with a joining layer 132. The joining layer 132 may be of a braze alloy as described herein. The interior sleeve 133 may be joined to the nozzle body 130 using a braze method described herein. The interior sleeve 133 may be joined to the nozzle body 130 with an braze layer 132 wherein there is no diffusion of the joining layer 132 into the nozzle body 130 or into the interior sleeve 133. In applications where the erosion of the nozzle occurs primarily at the tip of the nozzle, the use of the interior sleeve 133 comprising a wear resistant material, such as sapphire, allows for the use of a nozzle primarily manufactured from a low cost material, such as alumina, while gaining the benefit of the high wear and erosion resistance of a highly wear resistant material at an identified high wear area.

Figure 14:
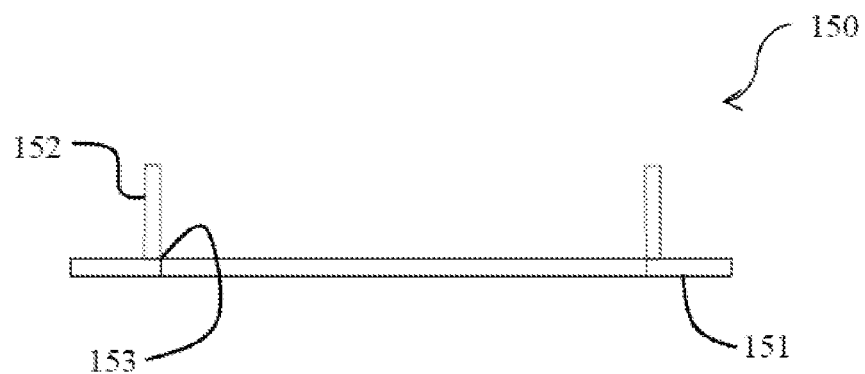
FIG. 14 is a focus ring according to some embodiments of the present invention.

In some embodiments of the present invention, as seen in cross-section in FIG. 14, a focus ring 150 with a collar 151 is joined to the top surface of a focus tube 152 with a joining layer 153. In some aspects, the collar 151 is alumina. In some aspects, the collar 151 is aluminum nitride. In some aspects, the focus tube 152 is sapphire.

Figure 15:
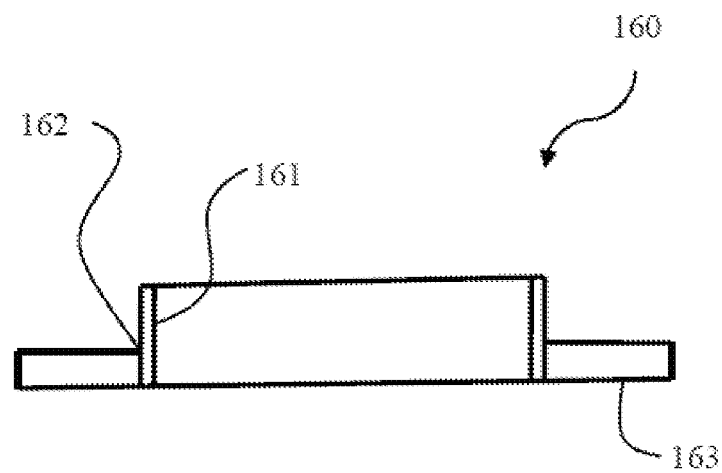
FIG. 15 is a focus ring according to some embodiments of the present invention.

In some embodiments of the present invention, as seen in FIG. 15, a focus ring 160 has a focus ring structure 163 which is joined to a focus tube sleeve 161 with a joining layer 162 along its interior diameter. The focus tube sleeve 161 may be a cylindrical sleeve. In some aspects, the focus ring structure 163 is alumina. In some aspects, the focus ring structure 163 is aluminum nitride. In some aspects, the focus tube sleeve 131 is sapphire. In some aspects, the focus tube sleeve 131 is a unitary piece. In some aspects, the focus tube sleeve 131 is comprised of a plurality of pieces.

Hydraulic fracturing systems may include a hydraulic pressure exchanger system which may include rotating components which transfer pressure from a high pressure, less abrasive, fluid to a lower pressure, highly abrasive, fluid. The highly abrasive fluid may include sand, solid particles, and debris. The rotor and end covers of such a device are particularly susceptible to wear. The hydraulic pressure exchanger may be made of tungsten carbide in order to meet the wear demands, but this material is very expensive and also difficult to manufacture. Even with this wear resistant material, the components are subject to erosion and may need repair. An example of such a repair of a tungsten carbide system in seen in US 2016/0039054. The repair in that disclosure includes sawing off entire cross-sections of large components and replacing them.

An improved system for a hydraulic pressure exchanger is to cover high wear areas of components with a wear surface layer, or skin, of an extremely wear resistant material, such as sapphire. This approach may be used with a component that was previously made entirely, or in substantial part, of a high wear material which may only be needed in limited areas. A component made entirely, or in substantial part, of a high wear material may bring high cost that can be lowered with the approach as described herein. With the use of a high wear surface layer the bulk of the component can then be made of a less expensive and easier to manufacture material, such as alumina. A corrosion resistant joining layer may be used, such as an alloy described herein. The surface layer may be brazed to the underlying structure in such a manner that a corrosion resistant, hermetic, joint is created. This system may also be used for other industrial components with identified high wear areas.

Figure 16:
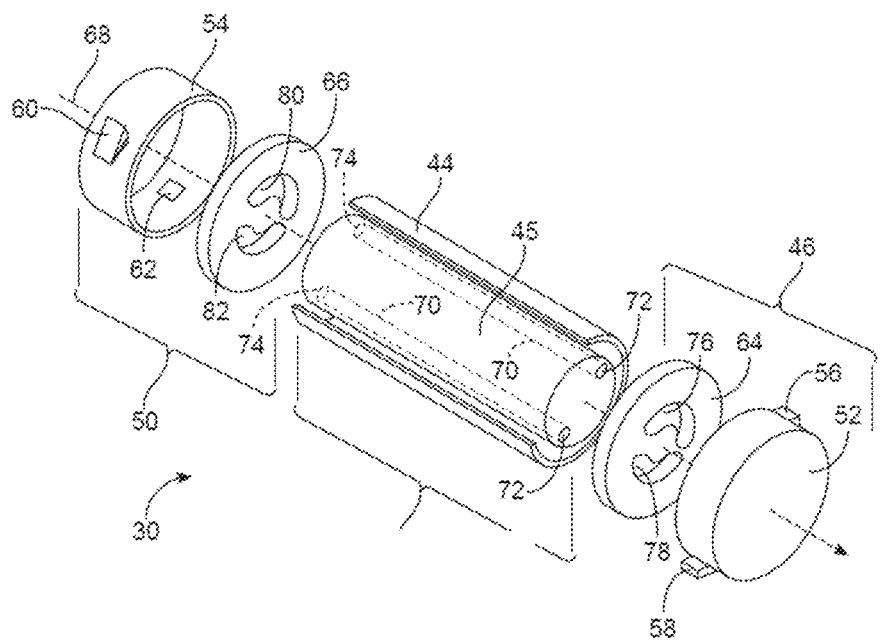
FIG. 16 is a drawing of a hydraulic pressure exchanging pump.

FIG. 16 is an exploded view of an embodiment of a rotary IPX 30. In the illustrated embodiment, the rotary IPX 30 may include a generally cylindrical body portion 42 that includes a housing 44 and a rotor 46. The rotary IPX 30 may also include two end structures 46 and 50 that may include manifolds 54 and 52, respectively. Manifold 52 includes inlet and outlet ports 58 and 56 and manifold 54 includes inlet and outlet ports 60 and 62. For example, inlet port 58 may receive a high-pressure first fluid and the outlet port 56 may be used to route a low-pressure first fluid away from the IPX 30. Similarly, inlet port 60 may receive a low-pressure second fluid and the outlet port 62 may be used to route a high-pressure second fluid away from the IPX 30. The end structures 46 and 50 include generally flat end plates (e.g., end covers) 66 and 64, respectively, disposed within the manifolds 50 and 46, and adapted for fluid sealing contact with the rotor 46. As noted above, one or more components of the IPX 30, such as the rotor 46, the end plate 66, and/or the end plate 64, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics.

Figure 17:
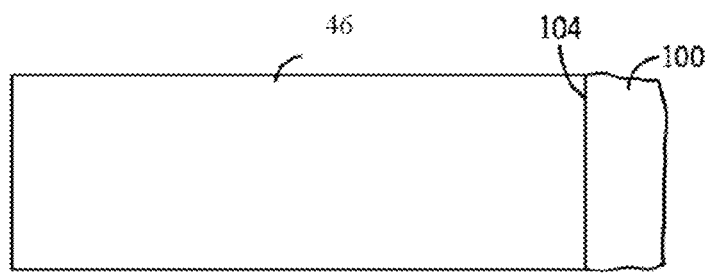
FIG. 17 is a drawing of a worn rotor.

The rotor 46 may be cylindrical and disposed in the housing 44, and is arranged for rotation about a longitudinal axis 68 of the rotor 46. The rotor 46 may have a plurality of channels 70 extending substantially longitudinally through the rotor 46 with openings 74 and 72 at each end arranged symmetrically about the longitudinal axis 66. The openings 74 and 72 of the rotor 46 are arranged for hydraulic communication with the end plates 66 and 64 in such a manner that during rotation they alternately hydraulically expose fluid at high pressure and fluid at low pressure to the respective manifolds 54 and 52. The components at the end of this system which are in contact with the erosive fracking fluids are especially susceptible to wear. An example of such wear is seen in FIG. 17, with a wear area 120 along the end of the rotor 46.

In some embodiments of the present invention, a protective surface layer is joined to the underlying structure in an area of high exposure to erosive elements. In contrast to the aforementioned example which is made from tungsten carbide, a substitute rotor can be made utilizing a first ceramic for the underlying structure, and a second ceramic for a surface wear protection layer. In some aspects, the surface layer is sapphire. In some aspects, the underlying structure is alumina. This allows for the use of a ceramic for the underlying structure which is much easier to produce, such as alumina.

The sapphire surface layer may be affixed to the underlying structure in any suitable manner. In some aspects, the surface layer is attached to the underlying ceramic structure by a joining layer that is able to withstand corrosive processing chemistries. In some aspects, the corrosive processing chemistries are related to fracking chemicals. In some aspects, the joining layer is formed by a braze layer. In some aspects, the braze layer is as described herein. In some aspects, the surface layer, or skin, is comprised of a plurality of pieces which may overlay each other, or may have a labyrinth interface, or abut each other.

Figure 18:
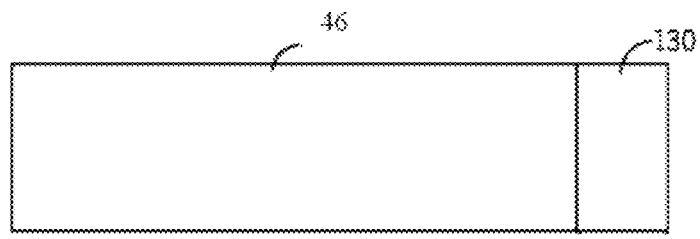
FIG. 18 is a rotor shaft according to some embodiments of the present invention.
Figure 19:
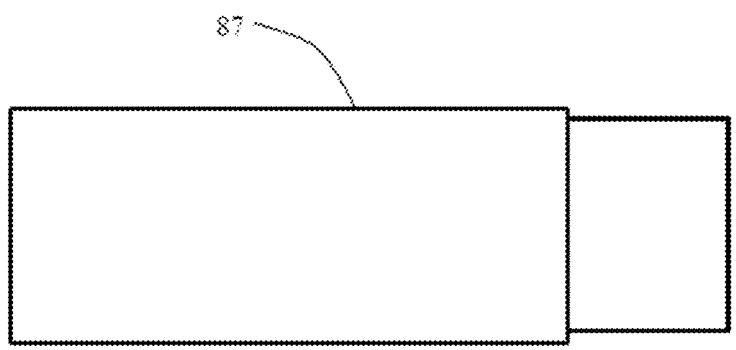
FIG. 19 is a rotor underlying structure according to some embodiments of the present invention.
Figure 20:
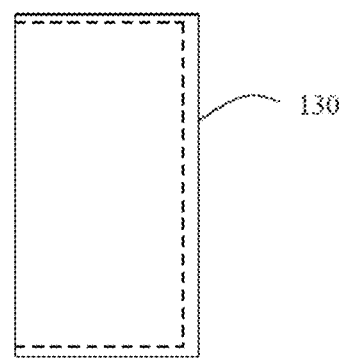
FIG. 20 is an end cap according to some embodiments of the present invention.

FIGS. 18-20 illustrates a rotor 86 according to some embodiments of the present invention. The rotor 86 has an underlying structure 87 and an end cap 130. The underlying structure 87 may be of alumina and the end cap 130 may be of sapphire. The end cap 130 may be joined to the underlying structure 87 with an aluminum joining layer in accord with methods described above. The underlying structure 87 is cylindrical with a lessened diameter and the end which interfaces with the end cap 130. The end cap 130 is a cylinder with a circular end plate. With the use of the end cap 130 over the underlying structure 87, the rotor 86 may be manufactured using a more practical material, such as alumina, with even greater wear resistance than previously seen in other approaches.

In some aspects, an end sleeve may be used over the rotor. In some aspects, a circular end cap may be used with the rotor. In some aspects, an end sleeve and a circular end cap may be used with the rotor.

In another exemplary embodiment, the longitudinal channels 70 may be lined with cylindrical linings of a highly wear resistant material, such as sapphire. The sapphire cylindrical linings may be brazed to the underlying structure of the rotor according to joining methods described above.

The use of highly wear resistant surface layers, such as of sapphire, over an underlying structure of a more practical ceramic, such as alumina, provides a significant improvement over current approaches to components exposed to high wear erosive environments. The good thermal expansion match of sapphire to alumina affords a good pairing of materials.

Figure 21:
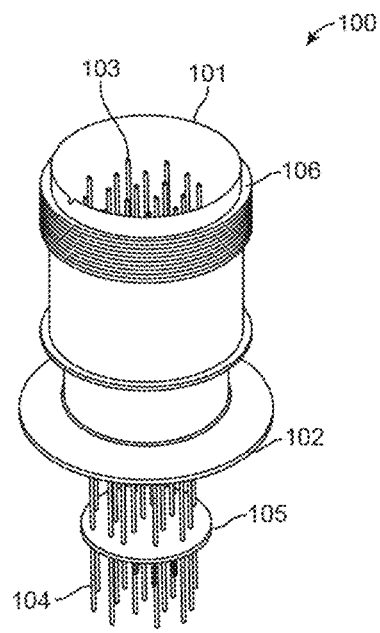
FIG. 21 is a photograph of a feedthrough.

FIG. 21 is an illustrative example of a prior art electrical feedthrough 100. Passing of electrical signals via feedthroughs which pass through vessel walls is a common requirement. Such feedthroughs have as basic requirements the ability to withstand necessary operating pressures, environments, and temperatures, while electrically isolating the needed electrical signals from the vessel wall. Feedthroughs utilized in vacuum systems typically are required to operate with a 1 ATM pressure differential with leak rates $<1 \times 10^{-9}$ sccm of He, and temperatures of several hundred degrees Celsius, while passing signals which can include power, radio frequency, instrumentation, and others. Other types of applications such as chemical processing, oil & gas applications and others may require different operating specifications such as higher pressures, temperatures, and chemical compatibility.

The electrical feedthrough 100 may have a first end 101 adapted to couple to an electrical cable with a cabling connector 106. Connector pins 103 may reside within the first end 101. A second end 102 may include electrical conductors 104 which may be separated by an insulator 105.

Figure 22:
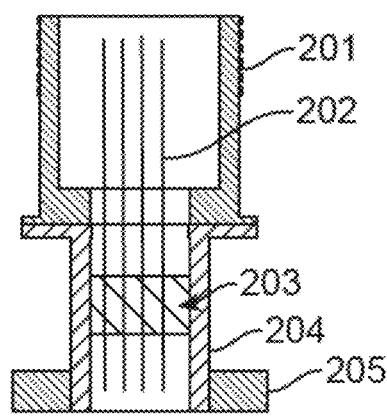
FIG. 22 is a cross-sectional sketch of a feedthrough.
Figure 23:
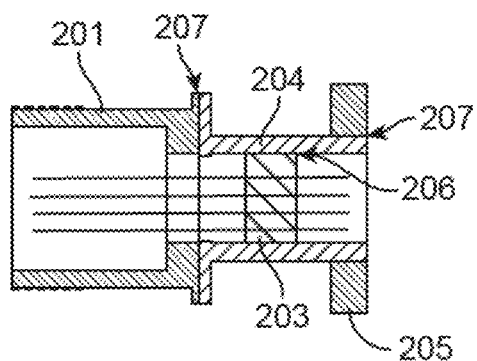
FIG. 23 is a cross-sectional sketch of a feedthrough.

FIGS. 22 and 23 are figurative cross-sectional views of a prior art electrical feedthrough which includes a Kovar housing. A ceramic part 203, typically aluminum oxide, is used for electrical insulation with a plurality of electrical conductors 202 brazed into the ceramic. The outer edge of the ceramic insulator 202 is brazed into a Kovar tubulation 204—Kovar is used to match the thermal expansion of the ceramic—and the Kovar is then welded to another metal 201, 205—typically a stainless steel alloy such as 303, 304, or 316—which is used as the connection to the vessel and to the connector to the cabling carrying the electrical signals.

There are several drawbacks with design and manufacturing of the electrical feedthroughs shown in FIGS. 22 and 23. These drawbacks relate to the use of Kovar as the housing for the alumina ceramic insulator. Kovar is used to match the CTE of the ceramic. During manufacturing, the alumina insulator is brazed to the Kovar. Brazing is typically done using a moly-manganese layer 206 on the alumina with a copper-silver brazing alloy, which is done at temperatures over 800 C. If a housing other than Kovar is used, the resulting stresses for the mismatch of the low CTE alumina and the high CTE metal will result in cracking of the ceramic. Kovar also has some undesirable characteristics. It lacks mechanical properties to make it a good connector for either the cabling or the vessel. It cannot be easily welded—welding it to stainless steel, which has the properties needed for good connectors, requires the use of e-beam welding in a few locations 207, which is expensive and slow. And Kovar itself is expensive, with limited supply.

In contrast to the above-mentioned designs, electrical feedthroughs according to the present invention allow for the brazing of metals directly to the ceramic, without the use of Kovar and without the use of other materials as a wetting agent, such as moly-manganese. In some aspects, a ceramic insulator is fashioned with a hollow center portion which allows for the insertion of material into the hollow center. The material may be inserted as a powder, a foil, or other form. The material is then brazed to the interior surface of the hollow center of the ceramic insulator with a hermetic brazed joint.

The wetting and flow of the brazing layer may be sensitive to a variety of factors. The factors of concern include the braze material composition, the ceramic composition, the susceptibility of the ceramic to diffusion, the chemical makeup of the atmosphere in the process chamber, especially the level of oxygen in the chamber during the joining process, the temperature, the time at temperature, the thickness of the braze material, the surface characteristics of the material to be joined, the geometry of the pieces to be joined, the physical pressure applied across the joint during the joining process, and/or the joint gap maintained during the joining process.

The pre-assembly is then subjected to increases in temperature, and a hold at the joining temperature. When the braze temperature has been reached, the temperature can be held for a time to effect the braze reaction. Upon achieving sufficient braze dwell time, the furnace may be cooled at a rate of 20 C per minute, or lower when the inherent furnace cooling rate is less, to room temperature. The furnace may be brought to atmospheric pressure, opened and the brazed assembly may be removed for inspection, characterization and/or evaluation.

Assemblies joined as described above result in pieces with hermetic sealing between the aluminum center and the interior surface of the ceramic tube. Such assemblies are then able to be used where atmosphere isolation is an important aspect in the use of the assemblies. Further, the portion of the joint which may be exposed to various atmospheres when the joined assemblies are later used in semi-conductor processing, for example, will not degrade in such atmospheres, nor will it contaminate the later semi-conductor processing.

Figure 24:
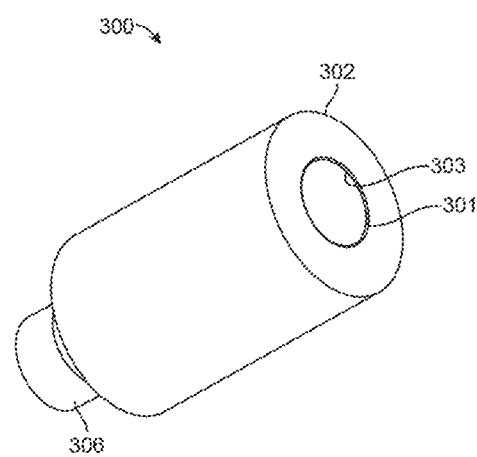
FIG. 24 is an illustration of a feedthrough according to some embodiments of the present invention.
Figure 25:
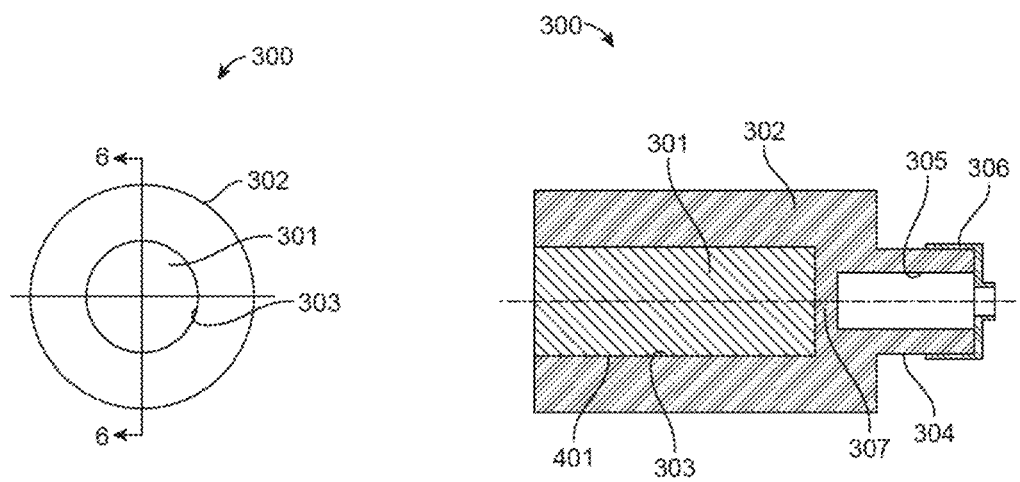
FIG. 25 illustrates a feedthrough according to some embodiments of the present invention.

In some embodiments of the present invention, as seen in FIGS. 24 and 25, a brazing assembly 300 which represents an interim step in the manufacture of a completed electrical feedthrough. Although this exemplary embodiment feeds through one electrical contact, other embodiments may feed through more electrical contacts.

In some embodiments, the ceramic tube 302 may have a blocking portion 307 which separates the hollow center 301 which will be filled with aluminum from a second hollow portion 305. A narrower outer surface 304 may also be seen at this end of the brazing assembly 300.

In some embodiments, a cap 306 is seen around the narrower outer surface of the brazing assembly. The cap 306 may be a nickel cap. In some embodiments, the nickel cap is brazed to the alumina ceramic narrower outer surface of the brazing assembly. In some embodiments, the nickel cap may be brazed onto the alumina during the same process step during which the braze material is joined to the inner surface of the main hollow of the ceramic piece.

Figure 26:
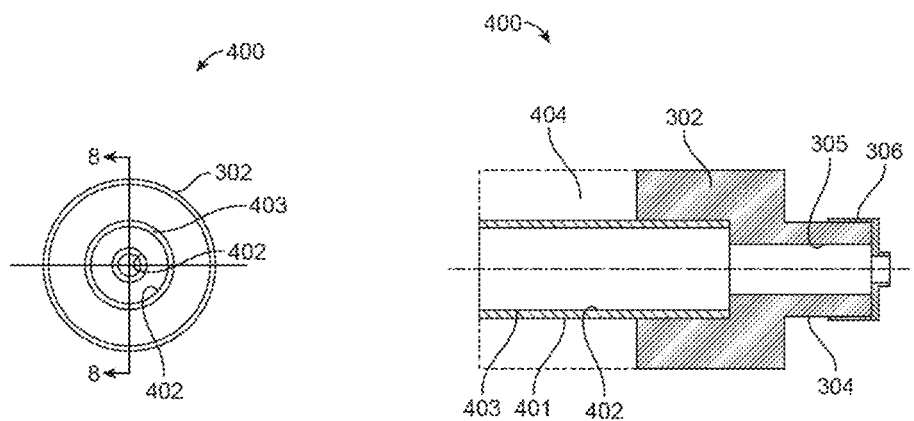
FIG. 26 illustrates a feedthrough according to some embodiments of the present invention.

After the brazing process, the brazing assembly 300 may be moved along to become the post-brazing assembly 400. A portion 404 of the ceramic tube may be removed to expose the outer surface 401 of the metal which had been brazed into the ceramic tube, as seen in FIG. 26. The metal 301 may be removed to form an aluminum tube 403. The blocking portion 307 may be removed to allow a continuous passage 402 from within the metal tube 403 to the nickel cap 306.

Figure 27:
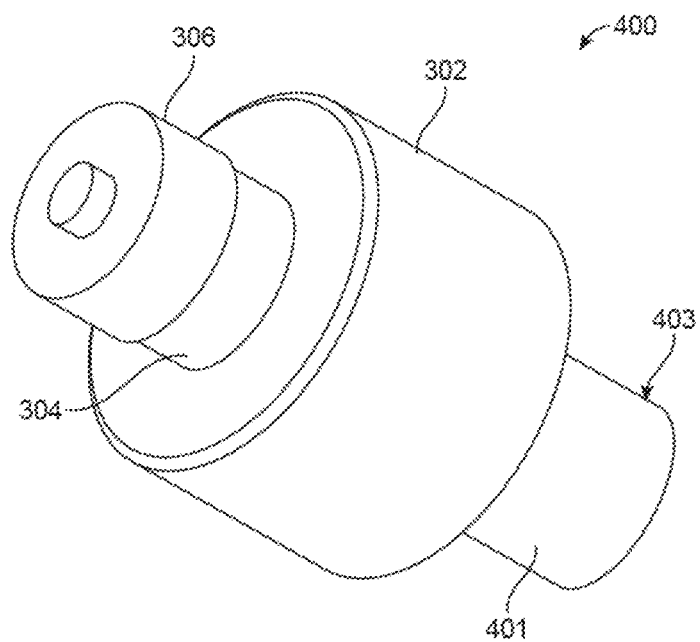
FIG. 27 illustrates a feedthrough according to some embodiments of the present invention.
Figure 28:
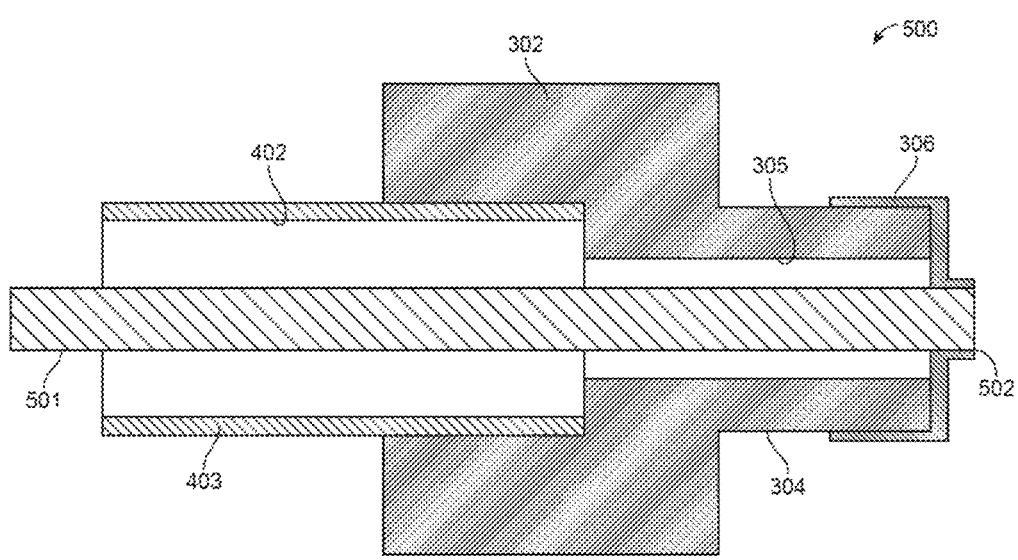
FIG. 28 illustrates a feedthrough according to some embodiments of the present invention.

FIG. 27 illustrates an exemplary single conductor feed through 500 after the insertion of a conductor 501 which may be welded 502 to the nickel cap 306.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A joining method, said joining method comprising the steps of:
   placing a brazing element between an interface area of a first ceramic piece and an interface area of a second ceramic piece to create a joining pre-assembly, wherein said brazing element consists of Carbon in the range of 1-80 atomic percent and the remainder of said brazing element is Cobalt;
   placing the components of said joining pre-assembly into a process chamber;
   removing oxygen from said process chamber; and
   heating at least said brazing element of said joining pre-assembly, thereby hermetically joining said first ceramic piece to said second ceramic piece.

2. The method of claim 1, wherein said first ceramic piece comprises a ceramic from the group of aluminum nitride, alumina, beryllium oxide, and zirconia, and said second ceramic piece comprises a ceramic from the group of aluminum nitride, alumina, beryllium oxide, and zirconia.

3. The method of claim 2, wherein said step of heating at least said brazing element comprises:
   heating at least said brazing element to a first temperature below the eutectic temperature of said brazing element; and
   heating at least said brazing element to second temperature above said eutectic temperature of said brazing element.

4. The method of claim 2, wherein said brazing element consists of Carbon in the range of 10-16 atomic percent.

5. The method of claim 1, wherein said first ceramic piece comprises a ceramic from the group of aluminum nitride, alumina, beryllium oxide, and zirconia.

6. The method of claim 1, wherein the step of removing oxygen from said process chamber comprises applying a pressure of lower than $1 \times 10E-4$ Torr to said process chamber.

7. The method of claim 6, wherein said step of heating at least said brazing element comprises:
   heating at least said brazing element to a first temperature below the eutectic temperature of said brazing element; and
   heating at least said brazing element to second temperature above said eutectic temperature of said brazing element.

8. The method of claim 1, wherein said second ceramic piece comprises a ceramic from the group of aluminum nitride, alumina, beryllium oxide, and zirconia.

9. The method of claim 1, wherein said step of heating at least said brazing element comprises:
   heating at least said brazing element to a first temperature below the eutectic temperature of said brazing element; and
   heating at least said brazing element to second temperature above said eutectic temperature of said brazing element.

10. The method of claim 1, wherein said first ceramic piece and said second ceramic piece comprise the same ceramic material.

11. The method of claim 1, wherein said first ceramic piece and said second ceramic piece comprise different ceramic materials.

12. The method of claim 3, wherein the eutectic temperature of said brazing element is 1325° C.

13. The method of claim 1, wherein the step of placing said brazing element comprises a layer-by-layer process.

14. The method of claim 1, wherein the step of placing said brazing element comprises at least one of sputtering or CVD (chemical vapor deposition).

15. The method of claim 1, wherein the step of removing oxygen from said process chamber comprises applying a pressure of lower than $1 \times 10E^{-5}$ Torr to said process chamber.

16. The method of claim 9, wherein the step of heating at least said brazing element to a first temperature below the eutectic temperature of said brazing element has a duration of 2 hours.

17. The method of claim 9, wherein the step of heating at least said brazing element to second temperature above said eutectic temperature of said brazing element has a duration of 20 minutes.

* * * * *